(12) United States Patent
Ringe et al.

(10) Patent No.: US 11,256,646 B2
(45) Date of Patent: Feb. 22, 2022

(54) APPARATUS AND METHOD FOR HANDLING ORDERED TRANSACTIONS

(71) Applicant: Arm Limited, Cambridge (GB)

(72) Inventors: Tushar P Ringe, Austin, TX (US); Jamshed Jalal, Austin, TX (US); Gurunath Ramagiri, Austin, TX (US); Ashok Kumar Tummala, Cedar Park, TX (US); Mark David Werkheiser, Austin, TX (US)

(73) Assignee: Arm Limited, Cambridge (GB)

( * ) Notice: Subject to any disclaimer, the term of this patent is extended or adjusted under 35 U.S.C. 154(b) by 165 days.

(21) Appl. No.: 16/685,082

(22) Filed: Nov. 15, 2019

(65) Prior Publication Data

US 2021/0149833 A1 May 20, 2021

(51) Int. Cl.
*G06F 13/40* (2006.01)
*G06F 9/46* (2006.01)

(52) U.S. Cl.
CPC .......... *G06F 13/4027* (2013.01); *G06F 9/466* (2013.01)

(58) Field of Classification Search
None
See application file for complete search history.

(56) References Cited

U.S. PATENT DOCUMENTS 6,754,751 B1 * 6/2004 Willke ................ G06F 13/1621
710/112
2019/0340138 A1 11/2019 Mannava et al.
2019/0340147 A1 11/2019 Jalal et al.

OTHER PUBLICATIONS

International Search Report and Written Opinion of the International Searching Authority for PCT/GB2020/052281 dated Nov. 20, 2020, 12 pages.

* cited by examiner

*Primary Examiner* — Idriss N Alrobaye
*Assistant Examiner* — Dayton Lewis-Taylor
(74) *Attorney, Agent, or Firm* — Nixon & Vanderhye P.C.

(57) ABSTRACT

An apparatus and method are provided for handling ordered transactions. The apparatus has a plurality of completer elements to process transactions, a requester element to issue a sequence of ordered transactions, and an interconnect providing, for each completer element, a communication channel between that completer element and the requester element for transfer of signals between that completer element and the requester element in either direction. A given completer element that is processing a given transaction in the sequence is arranged to issue a response signal to the requester element over its associated communication channel that comprises an ordered channel indication to identify whether the associated communication channel has an ordered channel property. The ordered channel property guarantees that processing of transactions issued by the requester element over the associated communication channel in a given order will be completed by the given completer element in the same given order. The requester element is then responsive to the ordered channel indication to control timing of issuance from the requester element of at least one signal relating to one or more transactions after the given transaction in the sequence. By such an approach, the ordering flow adopted for ordered transactions can be varied by the requester element in dependence on the presence or absence of an ordered channel, whilst enabling interconnect-agnostic requester element designs to be utilised.

18 Claims, 13 Drawing Sheets

APPARATUS AND METHOD FOR HANDLING ORDERED TRANSACTIONS

BACKGROUND

The present technique relates to an apparatus and method for handling ordered transactions.

An interconnect may be used to provide connections between a plurality of elements within an apparatus. Some of those elements may be requester elements used to issue transactions, whilst others may be completer elements used to process those transactions.

In some instances, it is necessary for a sequence of transactions issued by a particular requester element to be processed in order, such transactions being referred to herein as ordered transactions. The interconnect can be arranged to provide a communication channel between each requester element and each completer element but it is typically a matter for the interconnect designer to determine whether to place any ordering constraints on particular communication channels or not. Adding an ordering constraint to all channels would typically be expensive in terms of hardware cost and overall system performance, and hence ordered channels only tend to be added where considered necessary. If an ordered channel is provided between a particular requester element and a particular completer element, then an efficient ordering flow can be employed to handle a series of ordered transactions routed over that ordered communication channel. However, if the ordered communication channel is not available, then a less efficient ordering flow needs to be deployed in order to ensure that the ordered transactions are in fact processed in order.

However, it is often the case that a requester element does not know, at the time of issuing a particular transaction in a sequence of ordered transactions, which completer element will process that transaction, and whether there is an ordered channel present in the interconnect between the requester element and that completer element. As a result, it is often the case that a requester element employs the less efficient ordering flow when handling ordered transactions, in order to ensure that the ordering constraints are met, and hence the potential performance benefits achievable when in fact there is an ordered channel between the requester element and the completer element are not realised.

It would accordingly be desirable to provide a technique which enabled an improved handling of ordered transactions.

SUMMARY

In one example arrangement, there is provided an apparatus comprising: a plurality of completer elements to process transactions; a requester element to issue a sequence of ordered transactions; and an interconnect providing, for each completer element, a communication channel between that completer element and the requester element for transfer of signals between that completer element and the requester element; wherein: a given completer element that is processing a given transaction in the sequence is arranged to issue a response signal to the requester element over its associated communication channel that comprises an ordered channel indication to identify whether the associated communication channel has an ordered channel property, where the ordered channel property guarantees that processing of transactions issued by the requester element over that associated communication channel in a given order will be completed by the given completer element in the same given order; and the requester element is responsive to the ordered channel indication to control timing of issuance from the requester element of at least one signal relating to one or more transactions after the given transaction in the sequence.

In another example arrangement, there is provided a method of handling ordered transactions, comprising: employing a plurality of completer elements to process transactions; employing a requester element to issue a sequence of ordered transactions; and providing, for each completer element, a communication channel between that completer element and the requester element for transfer of signals between that completer element and the requester element; causing a given completer element that is processing a given transaction in the sequence to issue a response signal to the requester element over its associated communication channel that comprises an ordered channel indication to identify whether the associated communication channel has an ordered channel property, where the ordered channel property guarantees that processing of transactions issued by the requester element over that associated communication channel in a given order will be completed by the given completer element in the same given order; and arranging the requester element to be responsive to the ordered channel indication to control timing of issuance from the requester element of at least one signal relating to one or more transactions after the given transaction in the sequence.

In a still further example arrangement, there is provided an apparatus comprising: a plurality of completer element means for processing transactions; a requester element means for issuing a sequence of ordered transactions; and an interconnect means for providing, for each completer element means, a communication channel between that completer element means and the requester element means for transfer of signals between that completer element means and the requester element means; wherein: a given completer element means that is processing a given transaction in the sequence is arranged to issue a response signal to the requester element means over its associated communication channel that comprises an ordered channel indication to identify whether the associated communication channel has an ordered channel property, where the ordered channel property guarantees that processing of transactions issued by the requester element means over that associated communication channel in a given order will be completed by the given completer element means in the same given order; and the requester element means for controlling, in response to the ordered channel indication, timing of issuance from the requester element means of at least one signal relating to one or more transactions after the given transaction in the sequence.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
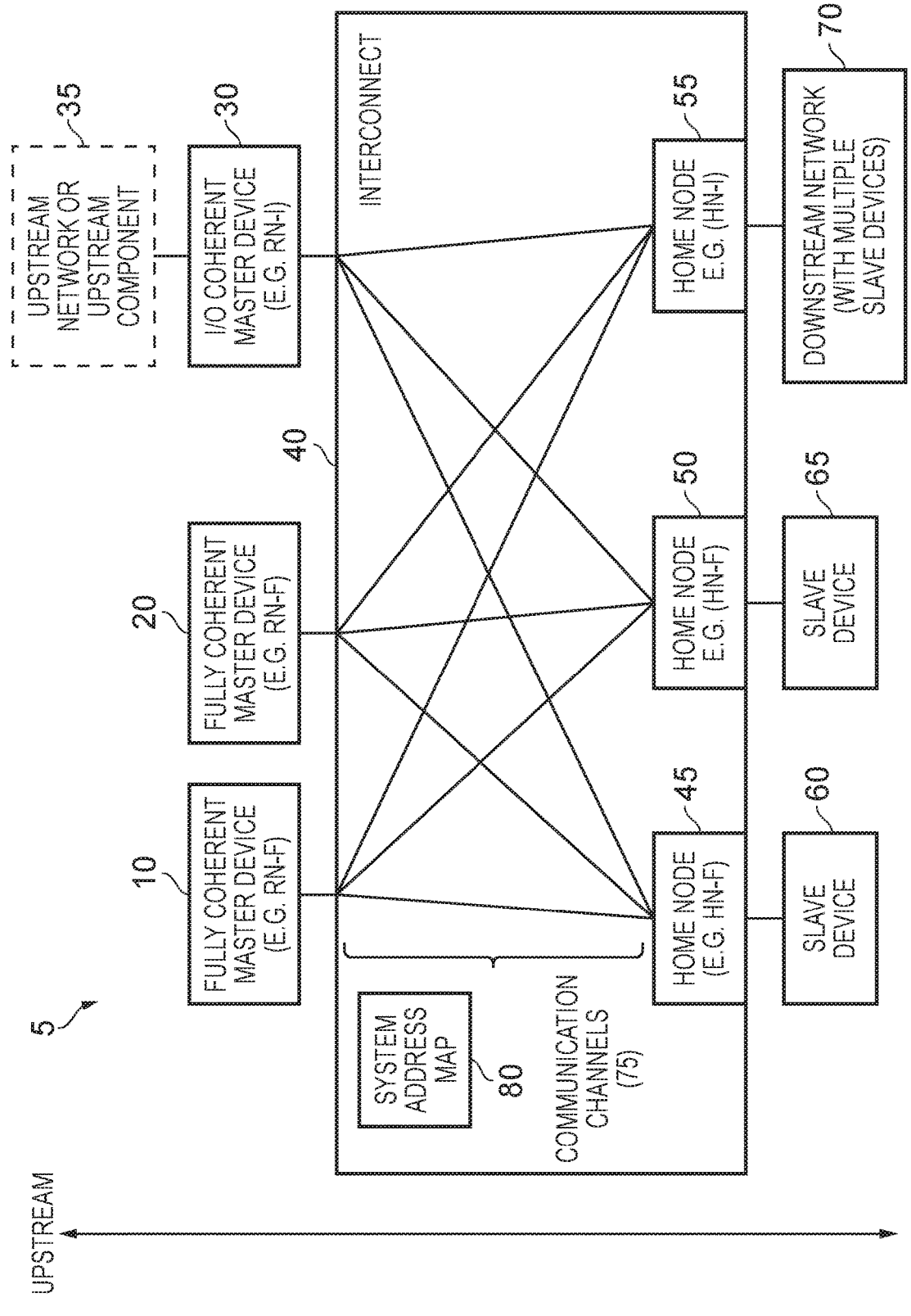
FIG. 1 is a block diagram of an apparatus in accordance with one example implementation.

In many designs of interconnect, there is the possibility of transactions being reordered between a requester element and a completer element, as such reordering can assist in improving overall performance in the system. However, in some instances a requester element may need to issue a sequence of ordered transactions, and in that case it needs to be guaranteed that the transactions will be processed in the order they are issued. Typically in such instances the requester element needs to adopt an ordering flow with regard to the issuance of the transactions that ensures that ordered transactions are unblocked only after some form of acknowledgement is received for older transactions.

However, some interconnect designs may enable the provision of ordered channels between at least some of the requester-completer pairs connected to the interconnect. If an ordered channel is provided, this guarantees that processing of transactions issued by the requester element over that channel in a particular order will be completed in the same order.

However, typically at the time a transaction is issued by the requester element, it does not know which completer element will process the transaction, and hence does not know whether that will be the same completer element that handled a preceding ordered transaction in a sequence of ordered transactions. Further, since the ordering characteristics of any particular communication channel within an interconnect is dependent on the micro-architecture design of that interconnect, the requester element will not typically know whether an ordered channel will be used. Hence, whilst a more efficient ordering flow for ordered transactions could be adopted if it is known that multiple of those transactions are targeting the same completer element over an ordered channel, the requester element is not typically in a position to determine this, and hence will often adopt a standard, less efficient, ordering flow.

Whilst it might be possible for certain platform specific programming to be performed within a requester element to seek to capture information about the completer elements associated with particular address ranges (to seek to enable the requester element to identify which completer element will handle a particular transaction), and the presence or absence of ordered channels between the requester element and those completer elements, this requires the provision of additional logic within the requester element to maintain and process such information, and would tie the requester element design to specific interconnect designs. Generally it is desirable to develop interconnect-agnostic requester element designs so that they can be used with a variety of different interconnect designs. The techniques described herein enable such interconnect-agnostic requester element designs to be developed, whilst still supporting the use of efficient ordering flows for ordered transactions in the presence of ordered channels within the interconnect.

In particular, in accordance with the techniques described herein an apparatus is provided that has a plurality of completer elements to process transactions and one or more requester elements that issue transactions. In particular, a requester element is provided that may issue a sequence of ordered transactions. The apparatus further provides an interconnect to connect together the various requester elements and completer elements. The interconnect provides, for each completer element, a communication channel between that completer element and the requester elements for transfer of signals between that completer element and the requester elements.

Further, a given completer element that is processing a given transaction in the sequence of ordered transactions is arranged to issue a response signal to the requester element over its associated communication channel that comprises an ordered channel indication to identify whether the associated communication channel has an ordered channel property. At the time a completer element receives a transaction for processing, it knows the requester element from which that transaction has originated, and hence knows which communication channel within the interconnect is being used. The completer element can then be provided with information (for example stored within a configuration register accessible to the completer element) as to whether that communication channel is an ordered channel or not, and accordingly can set the ordered channel indication appropriately.

If the communication channel has the ordered channel property, this guarantees that processing of transactions issued by the requester element over the associated communication channel in a given order will be completed by the given completer element in the same given order. The requester element can hence be arranged to be responsive to the ordered channel indication to control timing of issuance from the requester element of at least one signal relating to one or more transactions after the given transaction in the sequence. Hence, if the ordered channel indication indicates that the associated communication channel is not an ordered channel, the requester element can employ a standard ordering flow, where some form of acknowledgement needs to be received for older transactions before later transactions are unblocked. However, if the ordered channel indication indicates that the communication channel is an ordered channel, then a more optimised ordering flow can be adopted, allowing an earlier issuance of certain signals relating to one or more subsequent transactions than would be the case if the ordered channel were not present.

In one example implementation, the requester element is arranged to choose a signal timing scheme from a plurality of signal timing schemes to use for the one or more transactions after the given transaction in the sequence, in dependence on the ordered channel indication.

Furthermore, in one example implementation the requester element is arranged to further take into account, when choosing the signal timing scheme, whether the given transaction and the one or more transactions after the given transaction are to be processed by the same completer element. Hence, in situations where multiple of the ordered transactions are targeting the same completer element, and an ordered channel exists between the requester element and that completer element, then a signal timing scheme can be used that facilitates a more optimised ordering flow for those transactions, leading to an increase in performance of the apparatus.

The signals whose timing of issuance by the requester element is dependent on the ordered channel indication may vary dependent on implementation. However, in one example implementation the timing of issuance of a release indication signal from the requester element to the completer element is varied dependent on whether an ordered channel exists or not. In particular, the requester element may be arranged to issue a release indication signal to the completer element processing a transaction when the requester element determines that the data processed by all previous transactions in the sequence is observable, the release indication signal authorising the completer element to make the data that is being processed by the transaction available to other requester elements. The requester element will determine that the data processed by all previous transactions in the sequence is observable when it knows that the interconnect is in a position to make the data processed by any of those previous transactions available in response to a subsequent request issued to access that data (that subsequent request for example arising from a different requester element in the system). Hence, the release indication signal is the mechanism which it is ensured that data processed by a later transaction does not become available before data processed by an earlier transaction.

In such a system, the plurality of signal timing schemes may employ different criteria to determine when the release indication signal is to be issued. Hence, dependent on whether the ordered channel indication indicates the presence or absence of an ordered channel, the criteria used to assess when the release indication signal is to be issued can be varied.

In one example implementation, each completer element is arranged to issue a completion signal to the requester element when processing a transaction specifying a memory address, to indicate that sufficient steps have been taken by the completer element to ensure that an outcome of an operation required by that transaction will be observed by a further requester element that issues a further transaction specifying that memory address to the completer element. In accordance with a first signal timing scheme in the plurality, the requester element may then be arranged to issue the release indication signal to the completer element processing a current transaction when a completion signal has been received by the requester element for all preceding transactions in the sequence prior to the current transaction. In one example implementation the ordering flow that adopts such a first signal timing scheme may be referred to as a write-streaming flow. Such an approach can achieve high performance when targeting completer elements that act as a point of serialisation (POS) within the system, since such completer elements can directly issue the completion signal without needing to involve any elements downstream of the completer element (a downstream element being an element that is closer to memory than the completer element in question).

However, an alternative signalling timing scheme can also be supported. For instance, in one example implementation, each completer element is arranged to issue a data pull signal to the requester element when processing a transaction, to trigger the requester element to transmit to the completer element an item of data to be processed by the transaction. In accordance with a second signal timing scheme in the plurality, the requester element is then arranged to issue the release indication signal to the completer element processing a current transaction when a data pull signal has been received by the requester element for all preceding transactions in the sequence prior to the current transaction. Hence, in this example, the requester element does not need to await receipt of the relevant completion signals in respect of previous transactions before issuing the release indication signal, but instead can do so as soon as data pull signals have been received for the previous transactions. Such an approach can only guarantee ordering of the transactions if an ordered channel is present between the requester element and the completer element. However, since the ordered channel indication provided from the completer element can provide such information, this enables the requester element to switch to use the second signal timing scheme in certain situations where an ordered channel exists. In one example implementation, the ordering flow that adopts such a second signal timing scheme may be referred to as a write-tunnelling flow, and can be useful to improve performance when a single target completer element is used to process a series of ordered transactions in a situation where an ordered channel exists between the requester element and the completer element. In particular, this can significantly increase performance in situations where the completer element is not a point of serialisation, and hence where the completer element will need to perform downstream communication with one or more other elements before the completion signal can be issued.

In one example implementation, the requester element is arranged when considering which signal timing scheme to use for the current transaction, to detect when the response signal providing the ordered channel indication has been provided for both the current transaction and a preceding transaction, and to determine from a source indication field provided in both response signals whether those response signals have been issued by a same completer element. When the response signals have been issued by the same completer element and the ordered channel indication indicates that the ordered channel property exists in the associated communication channel between the requester element and the same completer element, the second signal timing scheme can then be employed, but otherwise the first signal timing scheme can be employed. It has been found that such an approach can significantly increase performance, by enabling the requester element to dynamically switch between the first and second signal timing schemes in dependence on whether an ordered channel is being used for a series of ordered transactions or not.

The response signal that provides the ordered channel indication can take a variety of forms, but in one example implementation the data pull signal is used as the response signal providing the ordered channel indication.

In one example implementation where the above approach is used, the sequence of ordered transactions comprise a sequence of ordered write transactions. The write transactions may need to be ordered irrespective of whether they are being processed by the same completer element or not, and the above described mechanism enables the requester element to adopt an efficient ordering flow by allowing a dynamic switching between the signal timing schemes dependent on whether the same completer element is being used to process multiple of the transactions, and in that instance dependent on whether an ordered channel exists with that completer element.

However, the techniques described herein are not limited to use in the above scenario, and there are other situations where the provision of the ordered channel indication in the response signal from the completer element can be used to improve ordering flow of ordered transactions, and thereby improve performance.

For example, in one implementation the requester element may have knowledge that the sequence of ordered transactions (whether they be ordered write transactions or ordered read transactions) will be processed by the same completer element. In that situation, the requester element may be arranged when considering which signal timing scheme to use for each subsequent transaction in the sequence after a current transaction, to detect when the response signal providing the ordered channel indication has been provided for the current transaction, and when the ordered channel indication indicates that the ordered channel property exists in the associated communication channel between the requester element and the completer element, to issue a request transfer signal for each subsequent transaction once the request transfer signals have been issued for all transactions in the sequence prior to that subsequent transaction. Otherwise timing of issuance of the request transfer signal for each subsequent transaction may be constrained until a predetermined signal has been received from the completer element for all transactions in the sequence prior to the subsequent transaction.

Hence, in the presence of the ordered channel, the requester element can issue requests for each of the remaining ordered transactions in the sequence back to back without needing to await receipt of a predetermined signal from the completer element for all previous transactions in the sequence before issuing a request for the next transaction in the sequence.

In situations where the sequence of ordered transactions comprise a sequence of ordered write transactions, the predetermined signal may be a data pull signal issued by the completer element to the requester element when processing a transaction, to trigger the requester element to transmit to the completer element an item of data to be processed by the transaction. The response signal providing the ordered channel indication can take a variety of forms, but in one example the data pull signal for the current transaction can be used as that response signal.

In situations where the sequence of ordered transactions comprise a sequence of ordered read transactions, the predetermined signal may be a read receipt signal issued by the completer element to the requester element when processing a transaction, the read receipt signal acknowledging to the requester element that the completer element has accepted the read transaction for processing. In such an implementation, the read receipt signal for the current transaction can be used as the response signal providing the ordered channel indication.

There are a number of ways in which the requester element may have knowledge that the sequence of ordered transactions will be processed by the same completer element, but in one particular implementation the requester element determines this in situations where each of the transactions specifies the same address.

The communication channel can be structured in a variety of ways, and in some implementations a number of different layers may be provided within the communication channel. For example, a transport layer (also referred to as a link layer) may be used to route transactions from a requester element to completer elements and the protocol used by the interconnect may place no restriction on whether the transport layer needs to be in order or out of order in nature. This may purely depend instead on the micro-architecture decisions taken by the interconnect designers. Similarly, a protocol layer may be provided that is responsible for completing the protocol flow for the transactions, and the interconnect protocol may use a retry-based mechanism for resource allocation between a requester and a completer. The retry-based mechanism may for example cause younger transactions to race ahead of older transactions when it comes to transaction allocation in a completer tracker. In such an implementation, the ordered channel indication may be arranged to indicate the ordered channel property when both a transport layer and a protocol layer of the communication channel are constrained to handle transactions in order. Hence, when both of the layers are arranged so that they are constrained to process transactions in order, then the communication channel can be viewed as having the ordered channel property.

Particular examples will now be described with reference to the Figures.

FIG. 1 is a block diagram of an apparatus in accordance with one example implementation. The apparatus includes a plurality of master devices 10, 20, 30 that are coupled via an interconnect 40 to a plurality of slave devices 60, 65, 70. In the example of element 70, this may be a downstream network which itself provides connections to multiple further slave devices.

Within the interconnect 40, a number of internal nodes 45, 50, 55 may be provided, which will be referred to herein as home nodes. The home nodes are arranged to receive transactions issued by the master devices and to process those transactions, which may result in downstream communication with connected slave devices. When considering the transactions issued by the master devices 10, 20, 30, the master devices may be considered to be requester elements, and the home nodes 45, 50, 55 may be considered to be completer elements. In processing those transactions, further transactions may also be issued downstream from the home nodes to connected slave devices, and for those transactions the home nodes 45, 50, 55 can be considered to be requester elements and the slave devices can be considered to be completer elements.

Whilst in FIG. 1 each home node connects to a single slave device or network, in some implementations multiple home nodes may connect to the same slave device, or one home node could connect to multiple slave devices.

As shown in FIG. 1, the interconnect 40 can establish multiple communication channels 75 for interconnecting the various master devices 10, 20, 30 and home nodes 45, 50, 55. In some implementations, the interconnect 40 may also provide communication channels used to communicate between the home nodes and various slave devices. Whilst the techniques described herein may in some implementations be employed either in relation to the transactions between the home nodes and the slave devices or the transactions between the master devices and the home nodes, for the purposes of the following discussion it will be assumed that the techniques are being applied in respect of the transactions issued between the master devices and the home nodes.

As shown in FIG. 1, the master devices may be of a number of different types. In the example shown it is assumed that the master devices 10, 20 are fully coherent master devices (for example central processing units (CPUs)) whose internal caches are kept coherent with caches in a lower level of the cache hierarchy, such as for example a system cache that may reside within the interconnect 40 (for simplicity, these caches are not shown in FIG. 1). To maintain this coherency, certain of the home nodes 45, 50 may be fully coherent home nodes that include a point of coherence that manages coherency by snooping the required fully coherent master devices, consolidating the snoop responses for a transaction, and sending a single response to the requesting fully coherent master device. Such home nodes will also typically act as a point of serialisation (POS) that manages order between memory requests.

Whilst the technique can be employed in respect of various types of interconnect, for the purposes of the following discussion it will be assumed that the interconnect uses the Advanced Microcontroller Bus Architecture (AMBA) developed by Arm Limited, Cambridge, United Kingdom, and in particular uses the AMBA 5 CHI (Coherent Hub Interface) Architecture Specification. In accordance with that specification, the fully coherent master devices are referred to as RN-Fs (fully coherent request nodes) and the fully coherent home nodes referred to as HN-Fs (fully coherent home nodes).

However, as shown in FIG. 1, not all of the master devices or home nodes need to be fully coherent. For example, an input/output (I/O) coherent master device 30 may be provided, in accordance with the AMBA 5 CHI Architecture Specification such an I/O coherent master device being referred to as a RN-I (I/O coherent request node). Such an I/O coherent master device 30 may be arranged to only generate a subset of transactions defined by the interconnect protocol, and does not require snoop functionality.

Similarly, one or more of the home nodes 55 may be a non-coherent home node (referred to in the AMBA 5 CHI Architecture Specification as an HN-I). Such a home node may be arranged to process a limited subset of the transactions defined by the protocol, does not include a point of coherence and is not capable of processing a snoopable request.

An I/O coherent master device 30 can be used to couple the apparatus shown in FIG. 1 to an upstream network or an upstream component 35. Purely by way of specific example, the I/O coherent master device 30 may provide an interface for connecting the apparatus shown in FIG. 1 to a PCIe network forming the upstream network 35 (the RN-I acting as a bridge to connect to a PCIe endpoint). Similarly, a non-coherent home node 55 could for example be used to connect the apparatus to a downstream I/O device or network 70, which again by way of specific example could be a PCIe network (the HN-I for example connecting to a PCIe root complex with potentially multiple PCIe endpoints behind the root complex). In such instances, it will be appreciated that through use of the I/O coherent master device 30 and the non-coherent home node 55, the CHI interconnect 40 can be used to provide a communication path between two separate PCIe networks 35, 70.

As discussed earlier, the communication channels 75 provided by the interconnect 40 can be arranged in a variety of ways, dependent on microarchitecture decisions taken at the time of designing the interconnect. At least some of the channels may be provided as ordered channels that have an ordered channel property that guarantees that processing of transactions issued by a requester element over such a communication channel in a given order will be completed by the completer element in the same given order. When a particular completer element wishes to issue a sequence of ordered transactions that need to complete in the same order that they are issued, then a more efficient ordering flow for those transactions can be adopted if it is known that an ordered channel exists between the requester element and the completer element that will process those transactions.

However, it is typically desirable to design the master devices in a manner that is interconnect-agnostic, and hence does not depend on the specific form of interconnect design used. At the time such a master device issues a transaction, it may not know which completer element will process that transaction, as for example a system address map 80 within the interconnect 40 may be used to map an address specified by the transaction to a particular completer node that is to process that transaction. Further, a requester node will not know whether the communication channel that will be used will be an ordered channel or not. Accordingly, unless detailed platform specific programming is performed within the requester elements to capture information about the completer elements that will be used for specific address ranges, and the capabilities of the communication channels that will be used when communicating between the requester element and those completer elements, in particular whether an ordered channel is provided or not, the requester element will typically have to resort to a standard ordering flow that can ensure ordering of those ordered transactions even in the absence of an ordered channel.

This means that it is often the case that the performance benefits that could be achieved from using an ordered channel are unrealised, since the requester element makes an assumption that the channel is not ordered, so as to ensure that the ordered transactions are handled in order. However, the techniques described herein provide a mechanism that enables a requester element to adopt more efficient ordering flows in the presence of an ordered channel, without needing to perform platform specific programming of requester elements, and hence enabling interconnect-agnostic requester element designs to be retained.

As shown in FIG. 1, when considering a pair of components within the apparatus, the component nearer the slave devices/main memory may be referred to as the downstream component and the component more remote from the slave devices/main memory may be referred to as the upstream component. Accordingly, a home node 45, 50, 55 will be a downstream component when compared to the master devices 10, 20, 30, but will be an upstream component when considered relative to the slave devices 60, 65, 70.

Figure 2:
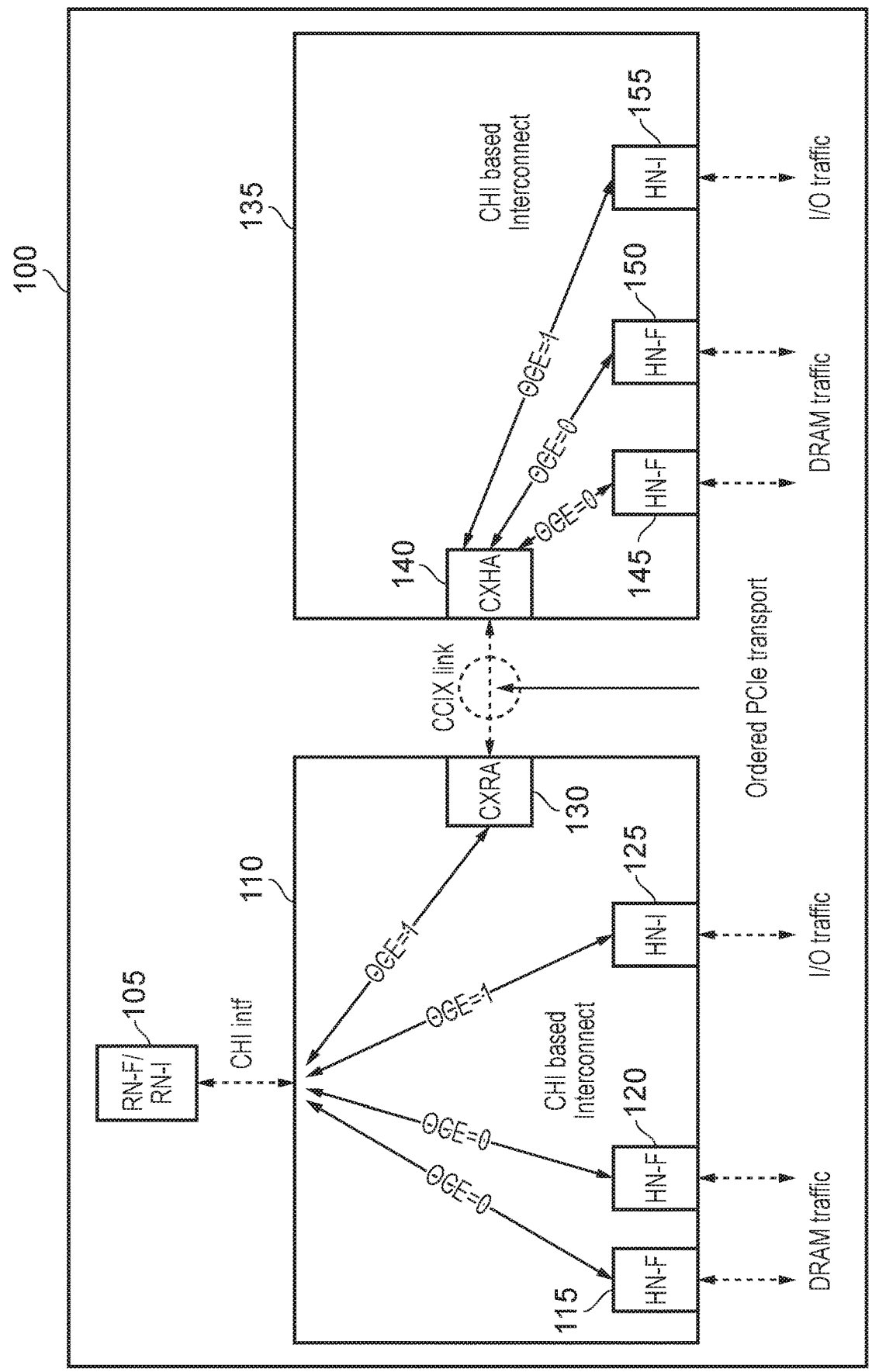
FIG. 2 is a block diagram illustrating an apparatus in accordance with a further example implementation.

It will be appreciated that FIG. 1 shows a relatively simple system with only a few master and slave devices, and a single interconnect 40 interconnecting those devices. However, the techniques can also be adopted in more complex systems. An illustrative example is shown in FIG. 2, where there are two inter-linked interconnects 110, 135, each of which may be CHI-based interconnects. When considering a particular master device 105, that master device will issue its transactions onto the interconnect 110 where the system address map may be used to identify the appropriate completer element to direct each transaction to. Whilst the completer element may in some instances be a home node 115, 120, 125 within the interconnect 110, it may be determined to be a linking element 130 used to couple the interconnect 110 to another interconnect 135. In the implementation shown the linking element 130 takes the form of a CXRA element, which is a bridge element used to connect CHI to a CCIX link for inter chip communication. A corresponding linking element 140 (in the example of FIG.

2 this being a CXHA element) will be provided in the other interconnect, and the linking elements 130, 140 can be connected via a suitable high speed link such as a PCIe based transport link referred to in FIG. 2 as a CCIX link. Transactions received by the linking element 140 in the second interconnect can then be mapped using a system address map in the second interconnect in order to route those transactions to an appropriate completer element, such as one of the home nodes 145, 150, 155 show in FIG. 2.

As discussed earlier, each communication channel may or may not be configured as an ordered channel, dependent on micro-architectural decisions taken at design time. In accordance with the techniques described herein, when a response is issued back to a requester element from a particular completer element, that response signal includes an ordered channel indication to identify whether the associated communication channel has the above-mentioned ordered channel property, and hence can be considered to be an ordered channel or not. In the following description, that ordered channel indication will also be referred to as an OCE (Ordered Channel Enable) indication, and can in one example be implemented as a 1-bit field whose value indicates whether the associated communication channel between a particular requester element and a particular completer element is an ordered channel or not.

As mentioned earlier, multiple layers may be provided within a communication channel, such as transport and protocol layers, and for a communication channel to be an ordered channel, each of those layers must have an ordering constraint that ensures that transactions issued in a particular order over that communication channel are processed in that same given order. As used herein an OCE encoding of 1 indicates that an ordered channel exists between the requester element and the completer element using that communication channel, whilst an OCE encoding of 0 indicates that an ordered channel does not exist between the requester element and the completer element. As will be discussed later herein, based on the value of that OCE field provided during a response issued in relation to a current transaction in an ordered sequence, and a determination as to whether subsequent transactions will be targeting the same completer element, the requester element can dynamically tune the ordering flows that it uses for a sequence of ordered transactions in order to seek to maximise performance.

There are a number of ways in which the completer elements can be provided with information about the communication channels. In particular, in contrast to a requester element which, at the time of issuing a transaction, may not know which completer element is to process the transaction, and hence which communication channel will be used, once a completer element receives the request signal of a transaction, that request signal will identify the source requester element, and hence the completer element knows which communication channel is being used. It can then be provided with access to information indicating whether the communication channel between that completer element and the identified requester element is an ordered channel or not, and thereby can set the value of the OCE encoding accordingly when issuing the response. For example, a configuration register may be provided in association with each home node to capture an OCE encoding value for each possible requester element that may communicate with that completer element, and that configuration register could be either hard-wired at build time, or writeable by software.

During the handling of a transaction, there will typically be a series of signals issued in both directions between the requester element and the completer element. For example, when initiating a transaction, a request signal will typically be issued from the requester element to the completer element. One or more signals may then be passed back from the completer element to the requester element to indicate progress in relation to the handling of that transaction. For a write transaction, a response signal (also called a data pull signal) will be issued to identify that the completer element has buffer space available to receive the write data, and on receipt of such a data pull signal the requester element can then issue the write data. For certain types of transaction, the completer element may also be arranged to issue a completion signal to the requester element when processing a transaction to indicate that sufficient steps have been taken by the completer element to ensure that an outcome of an operation required by that transaction will be observed by a further requester element that issues a further transaction specifying the same memory address to the completer element.

Further, for certain transactions, the requester element may be arranged to issue a release indication signal (also referred to herein as a completion acknowledgement signal, or comp ack signal) to the completer element processing the transaction when the requester element determines that the data processed by all previous transactions in the sequence is observable. There are a number of ways in which the requester element may determine the observability of all previous transactions, but in one example implementation the earlier-mentioned completion signals may be used for that purpose. The release indication signal authorises the completer element to make the data that is being processed by the associated transaction available to other requester elements.

Hence, in the absence of an ordered channel between a requester element and a completer element, the timing of issuance of the completion acknowledgement signal can be used to enforce ordering amongst a sequence of ordered transactions, since any individual completer element processing one of the transactions can be constrained to only make the data that it is processing in that transaction available to other requester elements once it receives the completion acknowledgement signal from the requester element, thereby giving the requester element the ability to control that timing amongst multiple completer elements that may be processing the various transactions of the sequence. However, as will be discussed in more detail below, in the event that an ordered channel exists between a requester element and a completer element and multiple of the ordered transactions are being issued to the same completer element, then the requester element may be able to determine that it does not need to await the completion signals in relation to previous transactions before it can issue the completion acknowledgement signal for a current transaction, hence improving performance. This will be discussed in more detail below with reference to the specific timing diagram examples of FIGS. 3 to 5.

Figure 3:
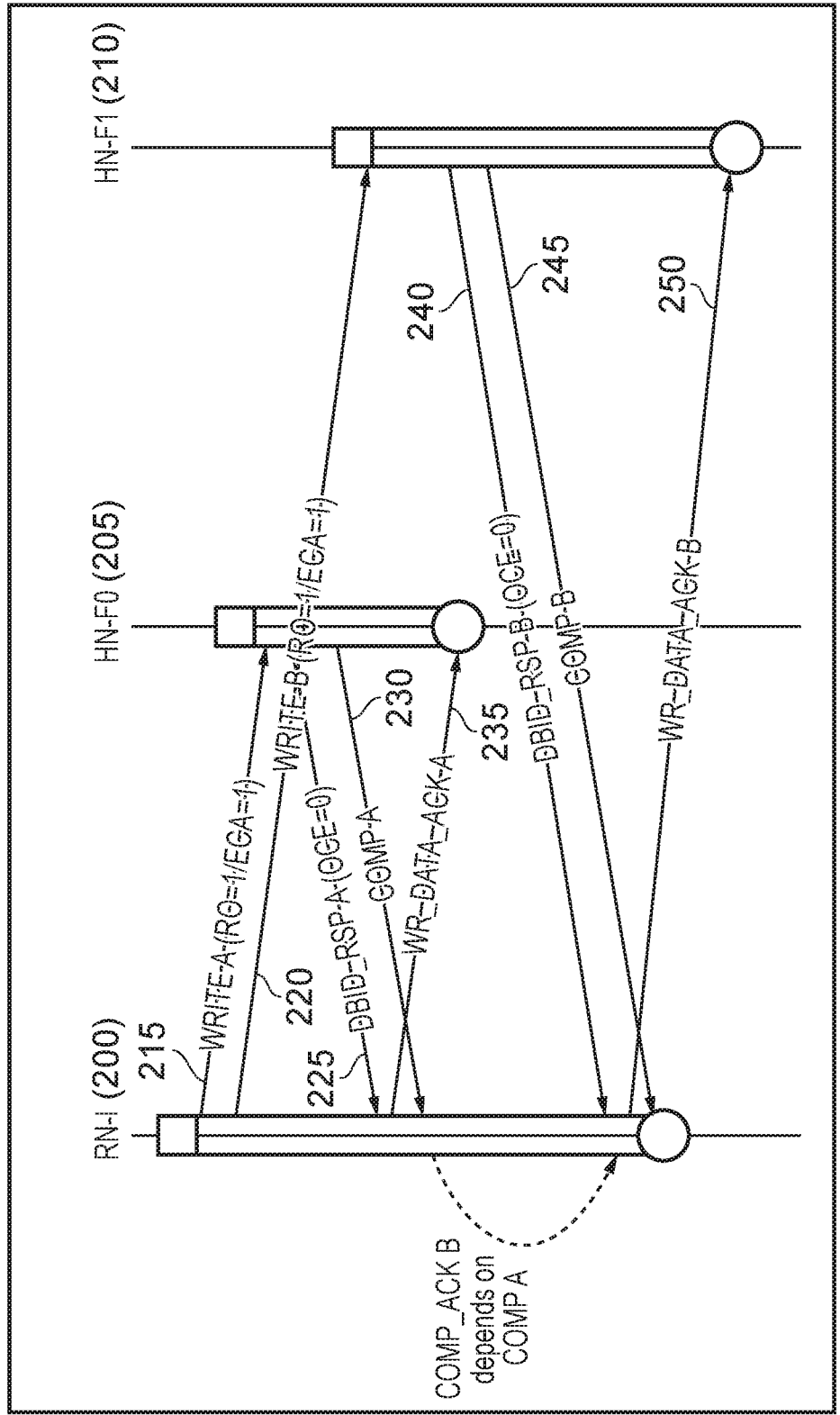
FIG. 3 is a timing diagram illustrating a write-streaming flow that may be employed in one example implementation.

FIG. 3 is a timing diagram illustrating a write-streaming flow that can be used when the completer element is a point of serialisation within the system, such as when the completer element is a fully coherent home node (HN-F) when considering the earlier mentioned AMBA 5 CHI protocol. Write-streaming flow may be deployed to support the Ordered Write Observation (OWO) ordering model supported by PCIe endpoint requesters, and since an RN-I can be used as a bridge which connects to a PCIe endpoint, the RN-I needs to support this flow. As shown in FIG. 3, an RN-I master device 200 may hence wish to issue a sequence of ordered write transactions, and these may not necessarily all be handled by the same completer element. In this example, two ordered write transactions are considered which are processed by different completer elements 205, 210, each of which is a fully coherent home node (HN-F). Hence, each of the completer elements is a point of serialisation within the system, and accordingly can itself take sufficient steps to ensure that an outcome of an operation required by a write transaction will be observed by a further requester element that issues a further transaction specifying that memory address to the completer element, without needing to communicate with any downstream components. Such fully coherent home nodes may for example include their own cache storage to cache write data for access by subsequent requests. As such, such a completer element may be able to issue a write completion signal relatively quickly, in some instances before it has received the write data, and in particular can do this once it has setup any hazard checks required to ensure that a subsequently received request specifying the same address as that associated with the write operation will be arranged to access the write data associated with the write operation.

Hence, considering FIG. 3, when adopting the write-streaming flow, the requester element 200 is allowed to issue the write requests 215, 220 of two ordered write transactions back-to-back in any order, without needing to wait for any response from the completer element 205 in respect of the first write transaction before issuing the write request 220 of the second write transaction. In the write request signals, the control values Reqorder (RO) and expcompack (ECA) are set equal to 1, to identify that the write streaming flow (or the later described write tunnelling flow) is being employed and that the home node will receive a completion acknowledgement signal. Considering the first write request 215, once the home node 205 has determined that there is sufficient buffer space to receive the write data from the requester element, it can issue a data buffer ID response signal 225 (also referred to herein as a data pull signal) to the requester element, in response to which the requester 200 can then issue the write data back to the completer element 205. Also, once the completer element 205 has performed the above mentioned hazard checks, it can then issue a completion signal 230.

In accordance with the write-streaming flow, the write data for a current transaction can be issued after all data pull requests have been received for any older ordered transactions in the sequence, and for the current transaction. Hence, since transaction A is the first transaction, the write data can be issued as soon as the data pull signal 225 is received in respect of transaction A.

Furthermore, when adopting the write-streaming flow, the requester element can send the completion acknowledgement (i.e. the earlier-mentioned release indication) signal for the current transaction after the completion signals have been received by the requester element for all older transactions in the sequence. Hence, because transaction A is the first transaction in the sequence, the completion acknowledgement signal is not constrained by awaiting the completion signal for any preceding transactions, and accordingly can be issued without waiting for any completion signals. In the example shown in FIG. 3, it is assumed that the write data signal and the completion acknowledgement signal are combined into a single signal, as indicated by the signal line 235 in FIG. 3. On receiving the completion acknowledgement signal as part of the combined signal over path 235, the home node 205 can then make the write data for transaction A available to other requester elements.

With regard to the second transaction (transaction B), then the home node 210 processes the write request over path 220 in much the same way as discussed earlier for the home node 205 processing transaction A. Accordingly, a data pull signal will be issued over path 240 once the home node 210 has space to receive the write data, and a completion signal will be issued over path 245 once the home node 210 has performed any necessary hazard checks. The write data can be issued from the requester element 200 to the home node 210 once the data pull signal 240 has been received, since at that point the data pull signal for the earlier transaction (transaction A) has also been received. If that had not been the case, and the home node 210 had instead issued the data pull signal for transaction B before the home node 205 had issued the data pull signal for the transaction A, then the requester element would need to await receipt of both data pull signals before allowing the write data for transaction B to be issued to the home node 210.

With regard to issuance of the completion acknowledgement signal for transaction B, then in accordance with the write-streaming flow the requester element 200 needs to await receipt of the completion signal for all previous transactions (in this example the completion signal for transaction A over path 230) before allowing the completion acknowledgement signal for transaction B to be issued. As illustrated in FIG. 3, again a combined write data and completion acknowledgement signal can be issued from the requester element to the home node 210, as indicated by the path 250. On receipt of the completion acknowledgement signal over path 250, the home node 210 can then make the data being processed by transaction B available to other requester elements.

Accordingly, it will be seen by adopting the write-streaming flow discussed above, the requester element can issue the request transfers of a series of ordered transactions back-to-back, and does not need to wait for any acknowledgement signal in respect of a first transaction in the sequence before issuing the next transaction in the sequence. Instead, the ordering constraint is enforced by the timing at which the completion acknowledgement signals are issued, and hence it can be seen that a first signal timing scheme is employed in respect of the completion acknowledgement signals when adopting a write-streaming flow.

Figure 4:
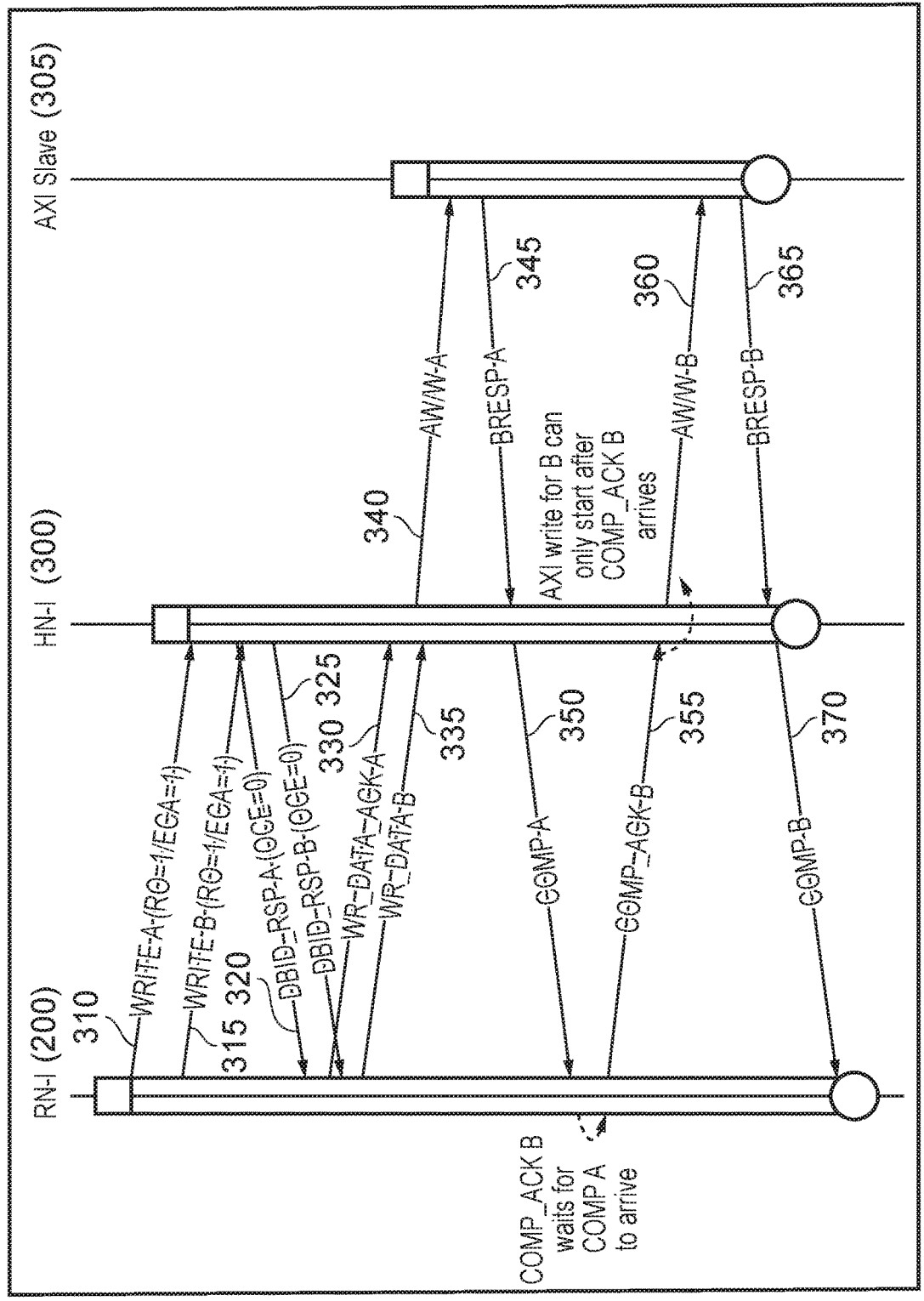
FIG. 4 is a timing diagram illustrating some inefficiencies that can arise when adopting a write-streaming flow in situations where the completer element is not a point of serialisation.

Whilst the write-streaming flow can be very efficient when the home nodes are a point of serialisation, adoption of the write-streaming flow essentially results in serialisation of the transactions in situations where the completer elements are not a point of serialisation. This is illustrated schematically by the example of FIG. 4 where first and second write transactions A, B are destined for the same completer element, in this case the non-coherent home node 300. As with the example of FIG. 3, the request transfers for the two transactions can be issued over paths 310, 315 back-to-back, without the requester element needing to await any acknowledgement in respect of transaction A before issuing the write request transfer of transaction B. As shown in FIG. 4, data pull signals can be issued for both transactions over paths 320, 325. Once the data pull response over path 320 has been received for transaction A, then the requester element 200 can issue the write data for transaction A. It can also issue the completion acknowledgement signal for transaction A, since there are no previous transactions in the sequence for which it needs to await receipt of the completion signal. Hence, a combined write data and completion acknowledgement signal can be issued over path 330 to the completer element 300.

Once the data pull signal has been received over path 325 in respect of transaction B, then because both the data pull signals for both transactions A and B have at that point been received, the requester element 200 can issue the write data for transaction B over path 335. However, the completion acknowledgement signal for transaction B cannot yet be issued by the requester element 200 in accordance with the write-streaming flow, since the completion signal has not yet been received from the completer element 300 for the first transaction (transaction A).

Once the completer element 300 has the completion acknowledgement signal for transaction A, it is then able to issue the data of that transaction downstream, at which point that data will become observable elsewhere in the system. In this particular example, it is assumed that the slave device 305 is an AXI slave device conforming to the Advanced eXtensible Interface (AXI) protocol forming part of the earlier-mentioned AMBA specifications developed by Arm Limited. As such, an address transfer is issued over a write address channel and the write data is issued over a write data channel, as indicated by the signal line 340. In due course, a response signal for transaction A will be issued from the AXI slave device 305, as indicated by the signal line 345, and on receipt of that signal the completer element 300 can then issue the completion signal for transaction A, as indicated by the signal line 350. Only at this point can the requester element 200 then issue the completion acknowledgement signal for transaction B, as indicated by the signal line 355.

As a result, even though the completer element 300 has had the write data for transaction B since receiving the signal over path 335, it cannot issue that data downstream until the completion acknowledgement signal is received, as indicated by the signal path 355. At that point, a write transaction can be propagated downstream over path 360, resulting in due course in a response from the AXI slave 305 over path 365, which then allows the completer element 300 to issue a completion signal for transaction B, as indicated by the signal line 370.

Hence, from the comparison of FIGS. 3 and 4, it will be seen that the write-streaming flow provides significant performance benefits when the completer element is a point of serialisation, but cannot achieve the same performance benefits when the completer element is not a point of serialisation. This can be particularly problematic, since as discussed earlier, such a non-coherent home node may be used when the interconnect 40 is being employed to provide a bridging connection between two high speed networks, such as PCIe networks.

In the above examples of FIGS. 3 and 4, it is assumed that an ordered channel is not available, and hence the relevant response signal issued by the completer elements sets the OCE indication to 0. In the examples considered herein, the response signal that provides the ordered channel indication is the data pull response signal, as clearly shown in FIGS. 3 and 4.

Figure 5:
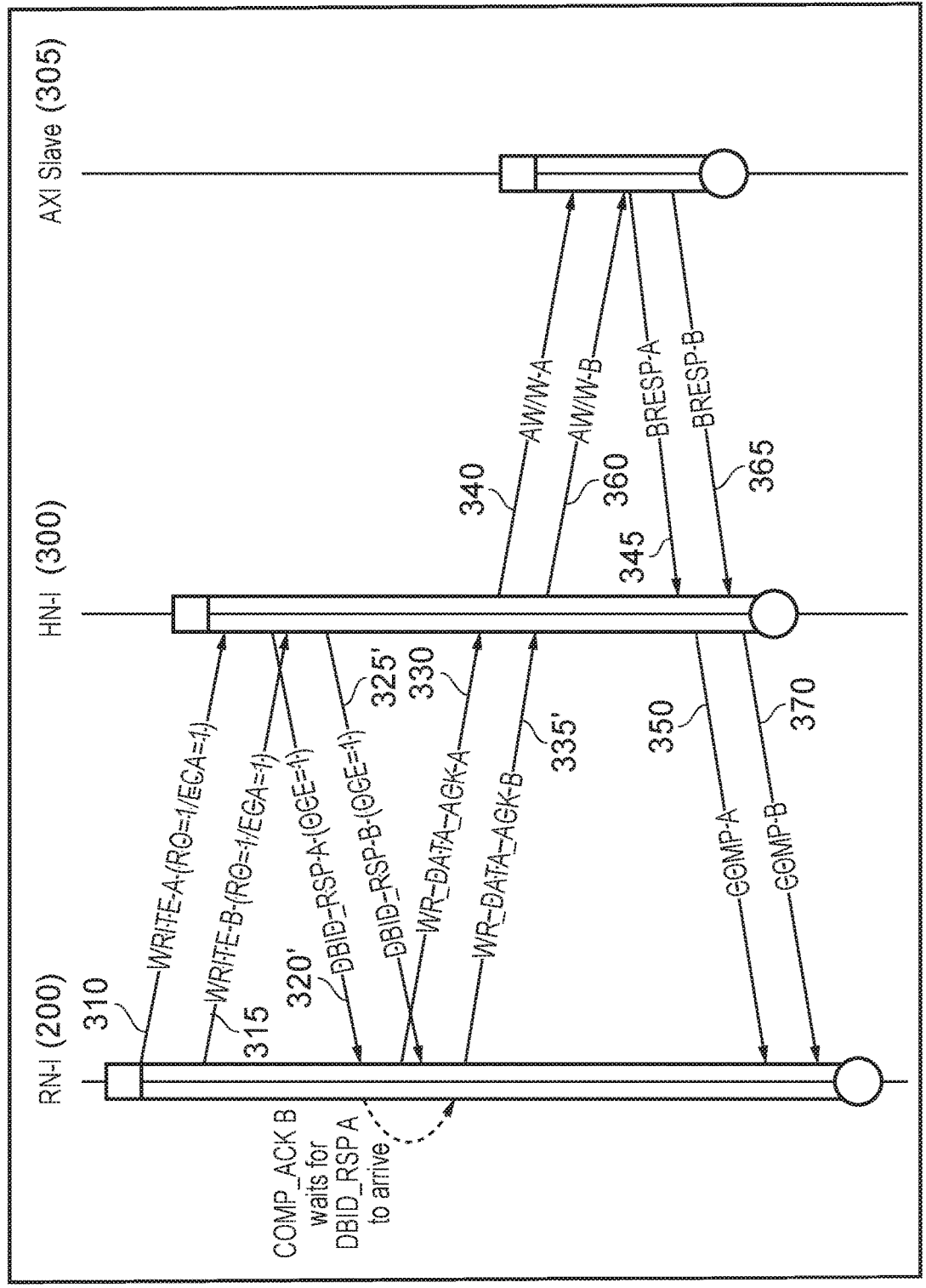
FIG. 5 is a timing diagram illustrating a write-tunnelling flow that can be adopted in order to improve the efficiency of handling a series of ordered write transactions when the completer element is not a point of serialisation, but where an ordered channel exists between the requester element and the completer element.

However, in instances where there is an ordered channel between the requester element and the completer element, an alternative ordering flow can be adopted, as shown in FIG. 5 where this ordering flow is referred to as a write-tunnelling flow. The signal lines in FIG. 5 are labelled consistently with the signal lines in FIG. 4, and accordingly it can be seen that as before the write transactions are issued over paths 310, 315. In accordance with the write-tunnelling flow, the requests are constrained to be issued in order. As with FIG. 4, the data pull signals are received, but this time the OCE flag is set to 1, and hence these signals are labelled 320' and 325' to distinguish them from the signals 320, 325 in FIG. 4. The constraints on issuing the write data are the same as for the earlier-discussed write-streaming flow, and hence the requester element needs to await not only a data pull signal for the current transaction, but also a data pull signal for any preceding transactions. Hence, the write data for transaction A can be issued once the data pull signal over path 320' has been received, and the write data for transaction B can be issued once both of the data pull signals for transactions A and B have been received over paths 320' and 325'. Further, as for the write-streaming flow, the requester element 200 can issue the completion acknowledgement signal without any constraint, since there are no previous transactions in the ordered sequence before transaction A. Hence a combined write data and completion acknowledgement signal can be issued for transaction A over path 330, in exactly the same manner as for the write-streaming flow example of FIG. 4.

However, in accordance with the write-tunnelling flow, the timing of issuance of the completion acknowledgement signal for a current transaction by the requester element is not constrained to await receipt of the completion signal in respect of all previous transactions. Instead, the completion acknowledgement signal for a current transaction can be sent as soon as all of the data pull signals have been received for previous transactions. Hence, once the data pull signal over path 320' has been received in respect of transaction A, the completion acknowledgement signal can be issued by the requester element 200 for transaction B. Hence, in contrast to the write-streaming flow approach of FIG. 4, the requester element 200 can issue a combined write data and completion acknowledgement for transaction B as indicated by the signal line 335' rather than being constrained by the write-streaming approach to only issue the write data by itself, as indicated by the signal line 335 in FIG. 4.

Since the completer element 300 now has the completion acknowledgement signals for both transactions A and B, it can process those transactions in parallel with respect to the downstream component AXI slave 305, and hence the address and data transfers 340, 360 can be issued without any dependence on each other. When the response signals are received over paths 345, 365, the corresponding completion signals can then be issued over paths 350, 370 back to the requester element 200.

Whilst in FIG. 5 the home node is a non-coherent home node 300, the write-tunnelling flow can also be used in relation to fully coherent home nodes (HN-Fs), although the performance benefits are more pronounced for non-coherent home nodes since they are not a point of serialisation.

Figure 6:
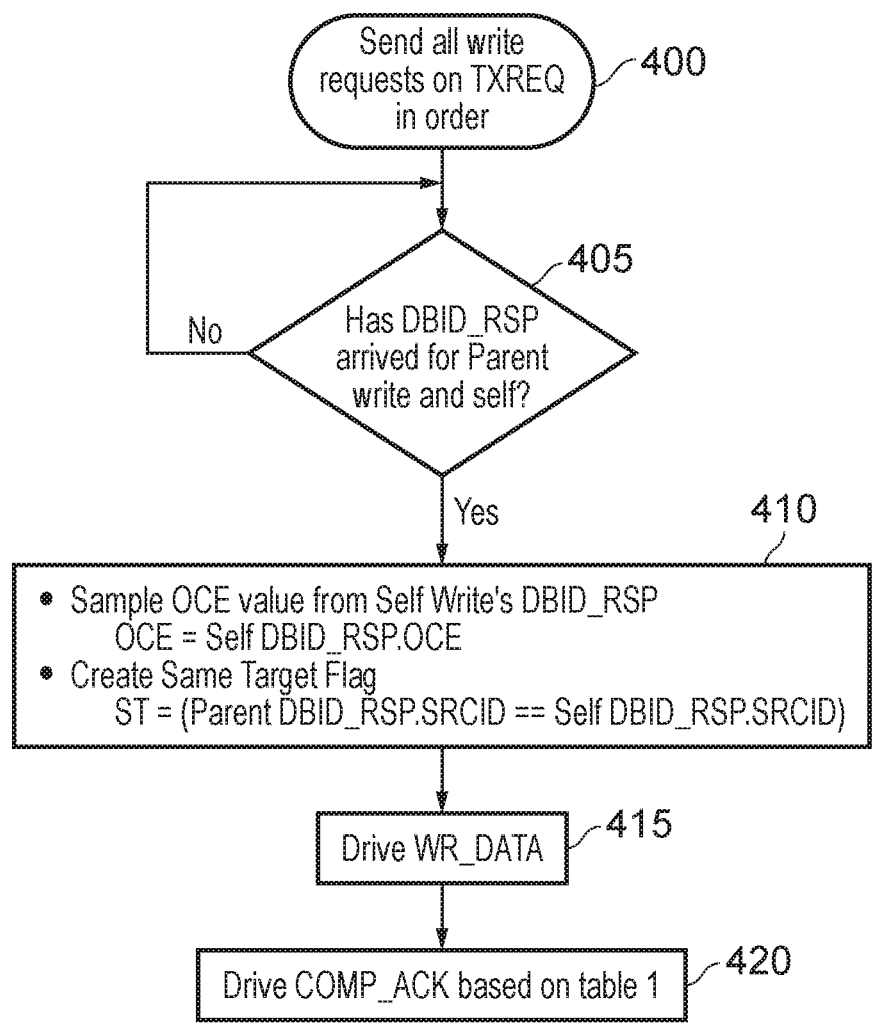
FIG. 6 is a flow diagram illustrating how an ordered channel indication provided by the completer element is used in one example implementation to enable dynamic switching between write-streaming flow and write-tunnelling flow.

Prior to the use of the present technique, it would be difficult for the requester element to assess when the write-streaming flow should be used and when the write-tunnelling flow can instead be used. However, through the provision of the OCE flag in the data pull signal from the completer elements, a simple check can be performed by the requester element to determine the appropriate timing to be used for issuance of the completion acknowledgement signal, and hence whether a first signal timing scheme corresponding to the write-streaming flow should be used or whether a second signal timing scheme corresponding to the write-tunnelling flow should be used. The steps taken by the requester element are illustrated schematically in FIG. 6. In this example, it is assumed that there are two transactions being performed, the first being transaction A (referred to in FIG. 6 as "parent") and the second being transaction B (referred to in FIG. 6 as "self", i.e. the current transaction). At step 400, the write requests for both transactions are issued in order. At step 405, it is determined whether the data pull signals have been received for both transactions, and when this is the case, the process proceeds to step 410. Here it is determined whether both the parent transaction and the self transaction are targeting the same completer element. This can be determined by looking at the source identification information in both data pull signals. In particular, both of the data pull signals will identify the source of that transfer, and the target, the source in this case being the completer element that is processing the transaction and the target being the requester element. The requester element can also sample the OCE value. In principle, the OCE value provided in either of the data pull signals can be sampled, since it will only be relevant in situations where the same completer element is being used, and hence in that instance the OCE value will be the same in both data pull signals. As shown in FIG. 6, in the example shown the OCE value for transaction B (i.e. self) is sampled.

At step 415, the write data is driven onto the communication channel in accordance with the rules discussed earlier. In particular, at this point both data pull responses have been received, and accordingly the write data for both the parent transaction and the self transaction can be issued. However, as indicated by step 420, the timing of output of the completion acknowledgement signals will vary dependent on the evaluation performed at step 410, and in particular it will be understood from the earlier described FIG. 5 that in situations where the same completer element is being used, and the OCE flag is set to 1 to indicate the presence of an ordered channel, then the write-tunnelling flow can be used.

The particular way in which the signals evaluated at step 410 are used to determine the timing of output of the completion acknowledgement signal for transaction B (i.e. whether write-streaming or write-tunnelling is used) is illustrated in Table 1 below:

TABLE 1

| No | OCE | ST | COMP_ACK B released on | Comments |
|---|---|---|---|---|
| 1 | 0 | 0 | Arrival of COMP A | Write-streaming flow; No ordered channel |
| 2 | 0 | 1 | Arrival of COMP A | Write-streaming flow; No ordered channel |
| 3 | 1 | 0 | Arrival of COMP A | Write-streaming flow; ordered channel exists but two writes target different completer. |
| 4 | 1 | 1 | Arrival of DBID_RSP A | Write-tunnelling flow; ordered channel exists and writes target same completer. |

In particular, as shown in Table 1, the timing of the issuance of the completion acknowledgement signal for the second transaction (i.e. transaction "self") is dependent on the sampled OCE value and the determined ST value, the ST value being set to 1 when the two transactions are targeting the same completer element.

For completeness, the differences between the write-streaming flow and the write-tunnelling flow can be seen from the following Table 2 below:

TABLE 2

| Attributes | Write-streaming flow | Write-tunnelling flow |
|---|---|---|
| REQ sent | In any order | In-order |
| DAT sent | When all older DBID_RSPs and the current DBID_RSP have arrived | When all older DBID_RSPs and the current DBID_RSP have arrived |
| COMP_ACK sent | When all older COMPs have arrived | When all older DBID_RSPs have arrived |
| Ordered channel needed | No | Yes |
| Completer type | Stripped target/ Monolithic target | Monolithic target |
| Completer POS type | Must be POS for full performance | POS/non-POS |
| Typical completers | HN-F | HN-I/CXRA |

Figure 7A:
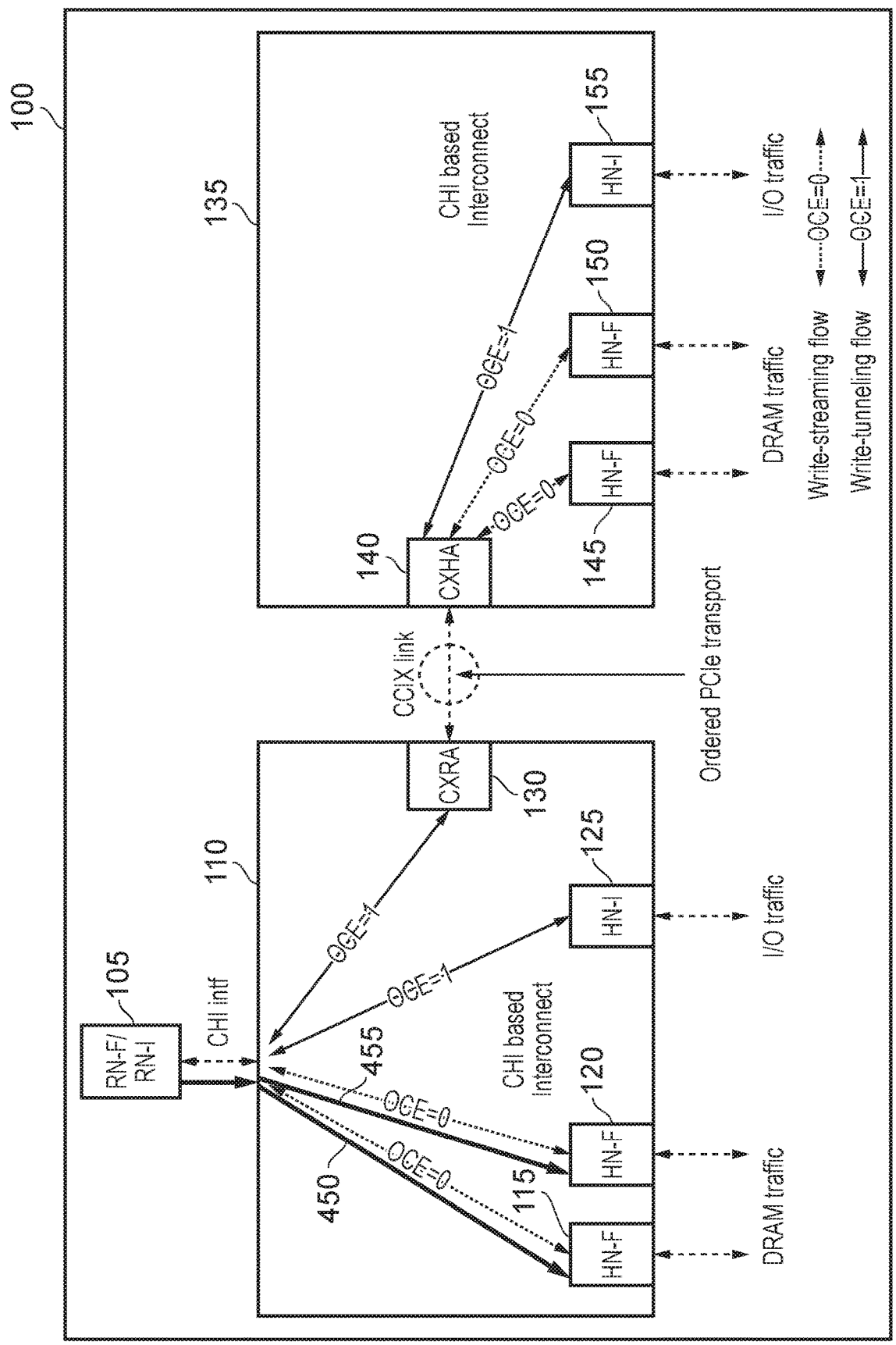
FIGS. 7A to 7D illustrate specific example use cases that can be supported within the apparatus of FIG. 2 when employing the techniques of FIGS. 3 to 6.

FIGS. 7A to 7D illustrate various applications of the dynamic switching flow discussed above with reference to FIG. 6, when considering the example implementation of FIG. 2. FIG. 7A illustrates how high throughput processing of ordered write transactions to local fully coherent home nodes 115, 120 can be achieved, as indicated by the lines 450, 455. In this case, even though there is not an ordered channel, write-streaming flow can be adopted to multiple fully coherent home nodes, and because the fully coherent home nodes are points of synchronisation high throughput can be achieved.

Figure 7B:
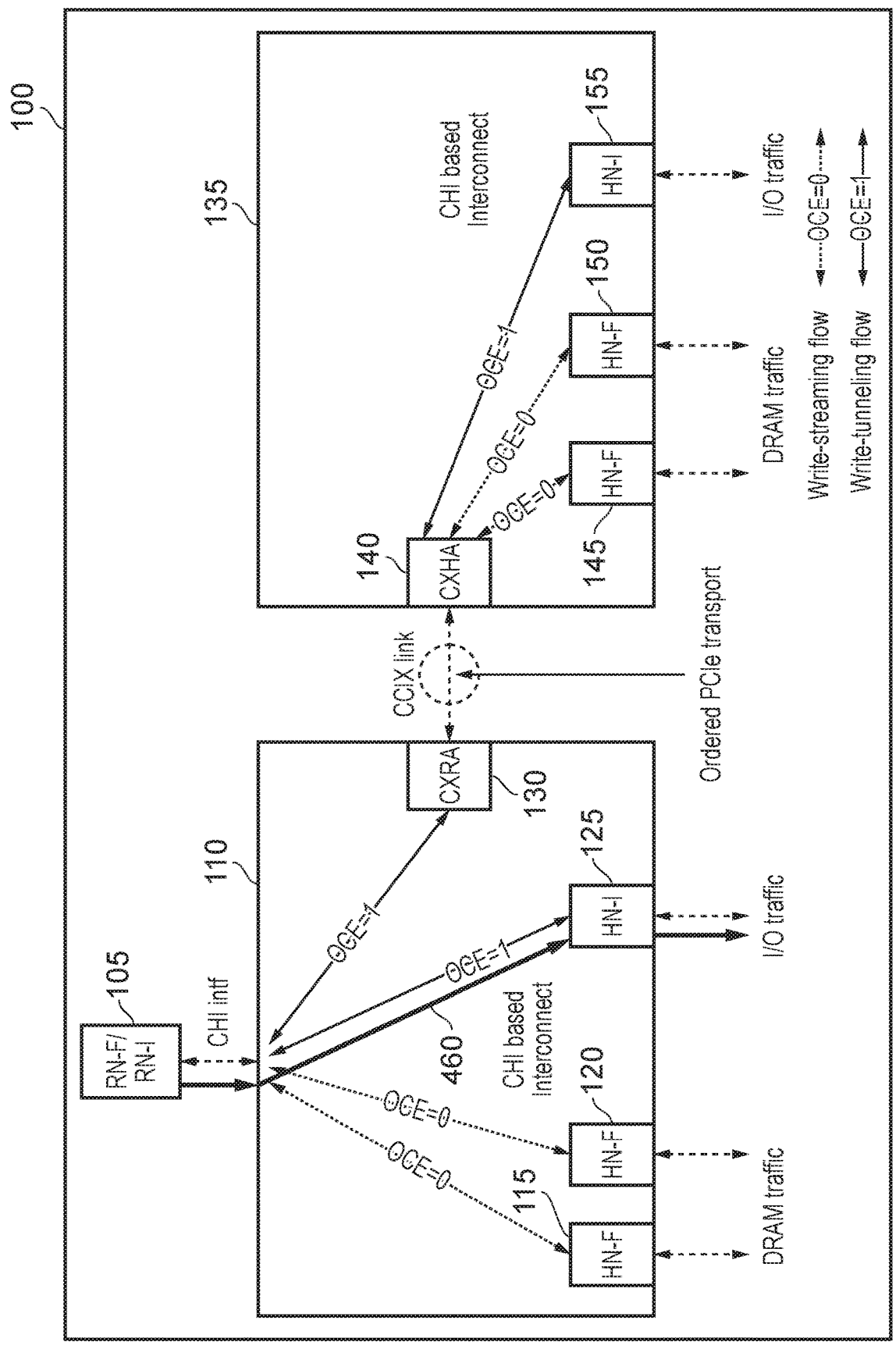

FIG. 7B illustrates how high throughput processing of ordered writes can be achieved to local non-coherent home nodes, such as the home node 125, as indicated by the line 460 in FIG. 7B. Since the series of transactions are directed to the same monolithic target (i.e. the HN-I 125), and an ordered channel exists between the requester element 105 and the completer element 125, write-tunnelling flow can be performed, thus maintaining high throughput. This for example can be used in situations where the interconnect 110 is being used as a peer to peer path between two PCIe networks, where high performance through the interconnect 110 is required.

Figure 7C:
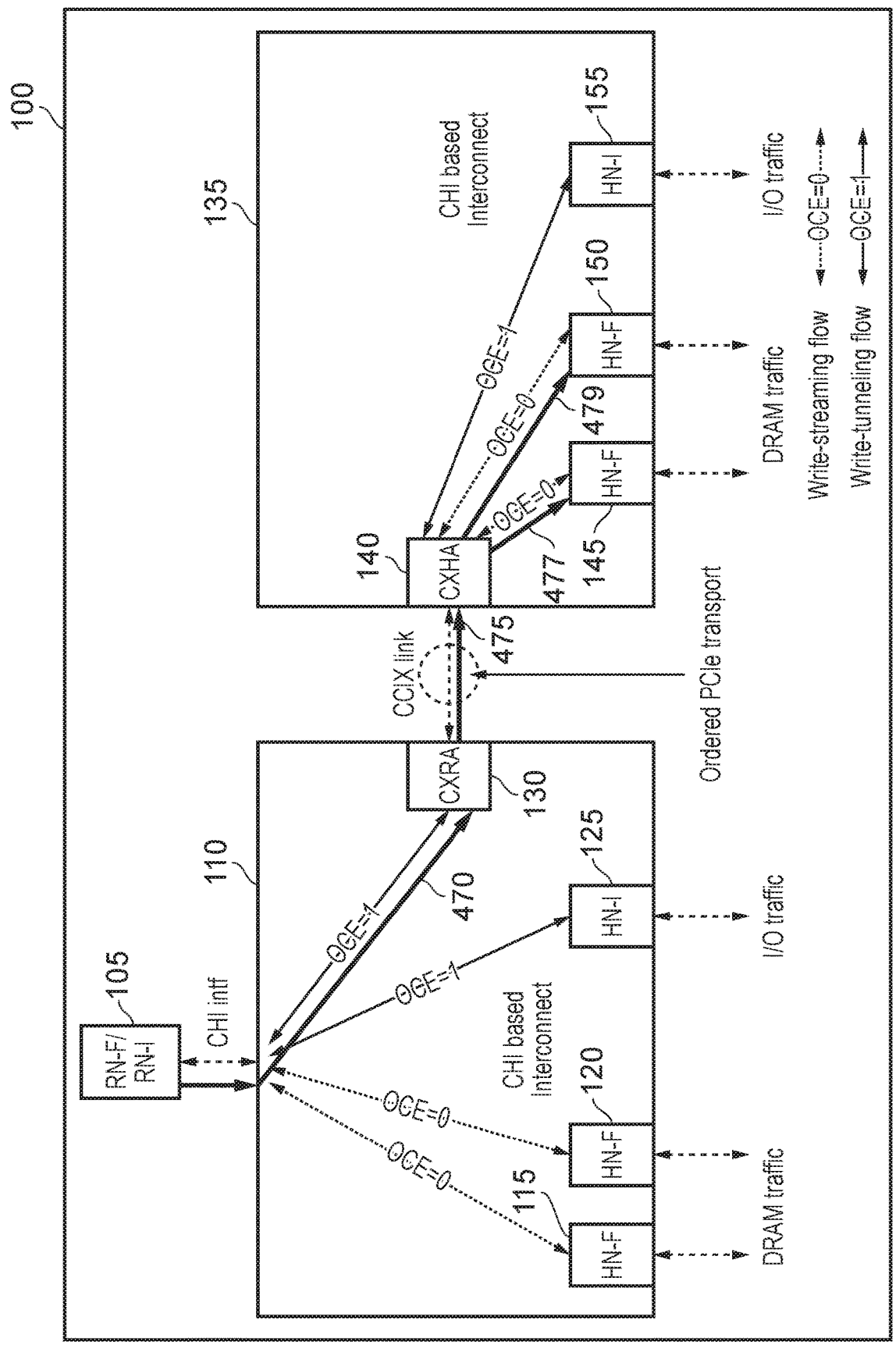

FIG. 7C illustrates how high throughput processing of ordered write transactions can be achieved in respect of remote fully coherent home nodes, such as the home nodes 145, 150 residing on the interconnect 135. Since an ordered channel exists between the requester element 105 and the linking element 130 acting as a completer element within the coherent interconnect 110, and all of the transactions destined for the remote home nodes 145, 150 will be passed through the element 130, write-tunnelling can be used for the communication between the requester element 105 and the link element 130, as indicated by the path 470. A fully ordered PCIe transport layer can then be provided on the CCIX link between the component 130 and the component 140 as indicated by the path 475, this already providing a high throughput link. Within the second interconnect 135, write streaming may be performed between the CXHA component 140 and the individual home nodes 145, 150, as indicated by the lines 477 and 479. As those home nodes are points of serialisation, high throughput can be achieved.

Figure 7D:
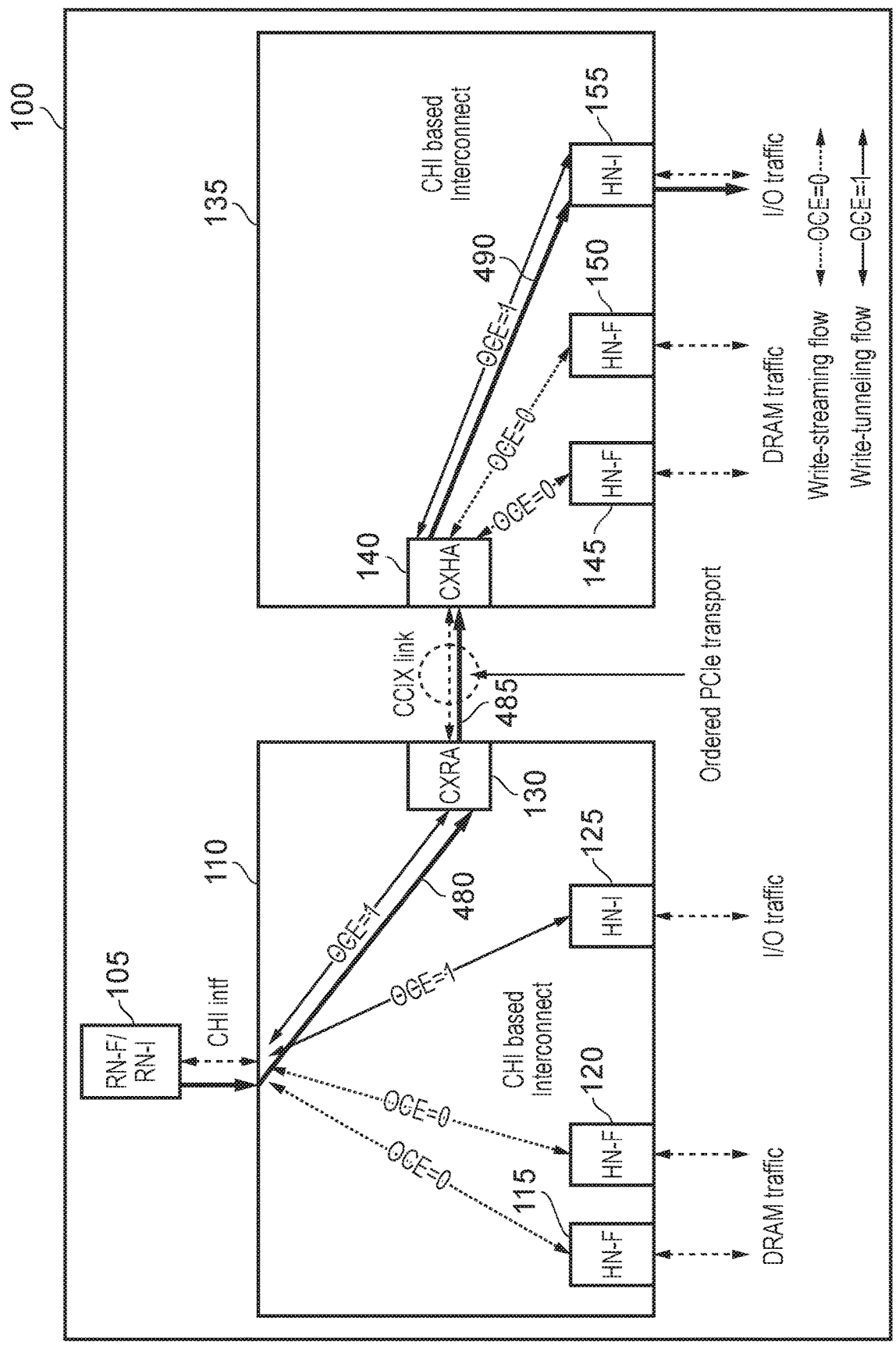

FIG. 7D illustrates how a high throughput processing of ordered write transactions can be performed in respect of remote non-coherent home nodes, such as the HN-I 155 connected to the interconnect 135. As with the earlier discussed FIG. 7C, write-tunnelling can be used between the requester element 105 and the component 130 as indicated by line 480, and a fully ordered PCIe transport layer exists between the two components 130, 140 linking the two interconnects together, as indicated by the line 485. Here, it is then assumed that the series of transactions all target the same monolithic home node 155, and that an ordered channel exists between the CXHA component 140 and the home node 155. Accordingly, write-tunnelling can be used between the component 140 and the home node 155, as indicated by the line 490.

Figure 8:
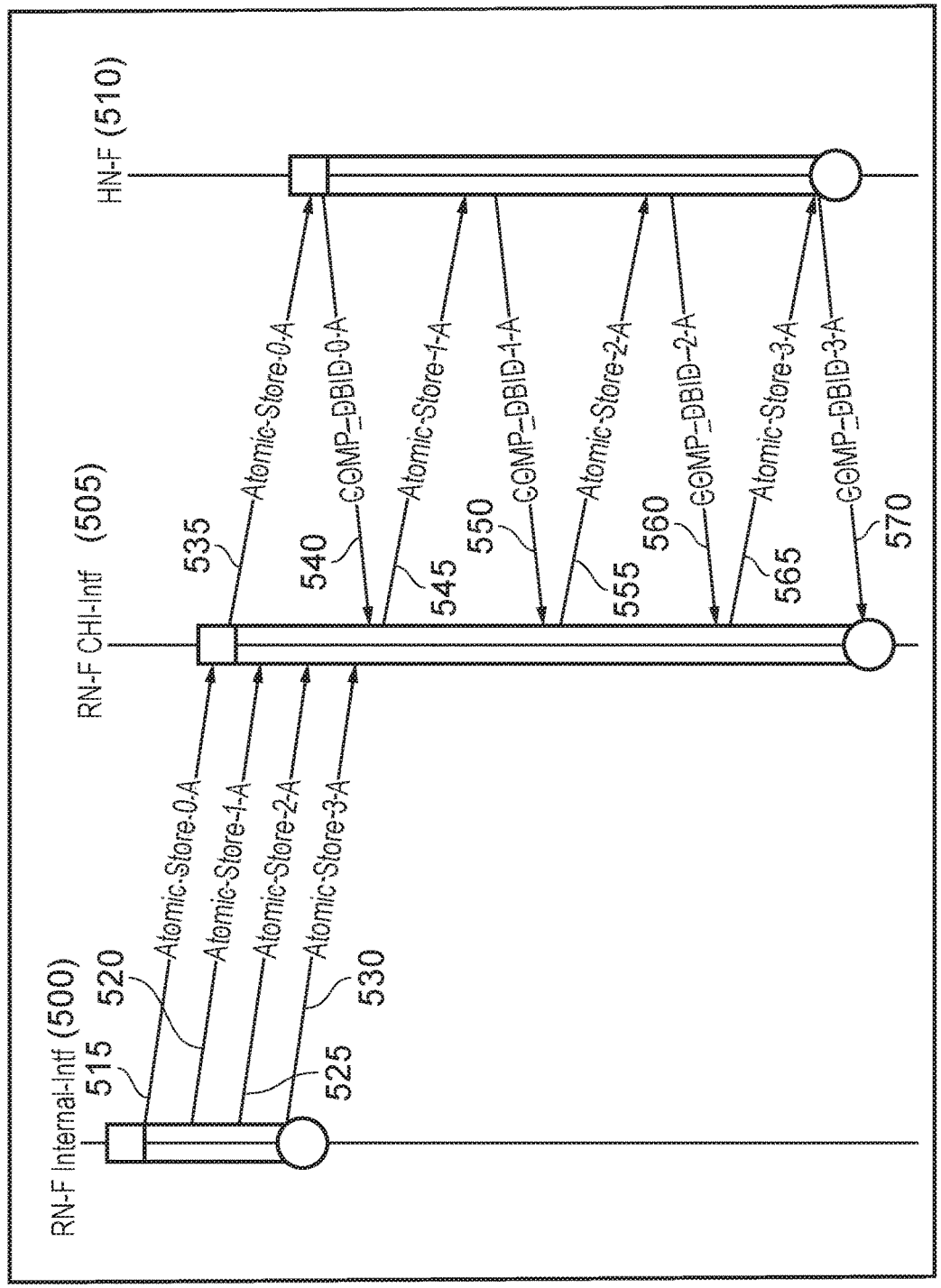
FIG. 8 is a timing diagram illustrating how multiple transactions to the same address might typically be handled when not adopting the techniques described herein.

Whilst in the above described examples of FIGS. 3 to 7D, the use of the ordered channel indication to enable dynamic switching between write-streaming and write-tunnelling flows has been described, the ordered channel indication can also be used in other scenarios to improve the performance of a series of ordered transactions. For example, a significant increase in performance can be achieved when there are multiple ordered transactions to be performed to the same address, whether those transactions be read transactions, write transactions, or indeed a mixture of both. Without use of the present technique, the timing may be as illustrated in FIG. 8, for the particular example scenario of four atomic store operations that need to be performed in order to the same address. These store operations could be incrementing a counter, or performing an arithmetic logic operation on data at a particular address, causing the data to be updated multiple times, and it may be required that those operations are performed in a specific order. In the example of FIG. 8, it is assumed that the operations are atomic operations since atomic operations do often target the same address. However, the technique described herein is not limited to use in association with atomic operations.

As shown in FIG. 8, internally within the requester element, four atomic store requests may be forwarded from the internal interface 500 to the interconnect interface 505, in this example a CHI interface, as indicated by the four signal lines 515, 520, 525 and 530. However, without use of the present technique, the requester node does not know whether an ordered channel is provided to the completer element, and accordingly will not issue a request for a subsequent transaction until an acknowledgement has been received from the completer element for a preceding transaction. Hence, the request for a first atomic store transaction is issued over path 535, and in due course the completer element issues a data pull signal over path 540. In this example, it is assumed that the data pull signal and the completion signal are combined into a single response signal issued over path 540. On receipt of the data pull signal (or on receipt of a read receipt signal in the event that the transactions are read transactions rather the write transactions), the requester element interface 505 can then issue the request for the next transaction as indicated by the signal line 545.

Figure 9:
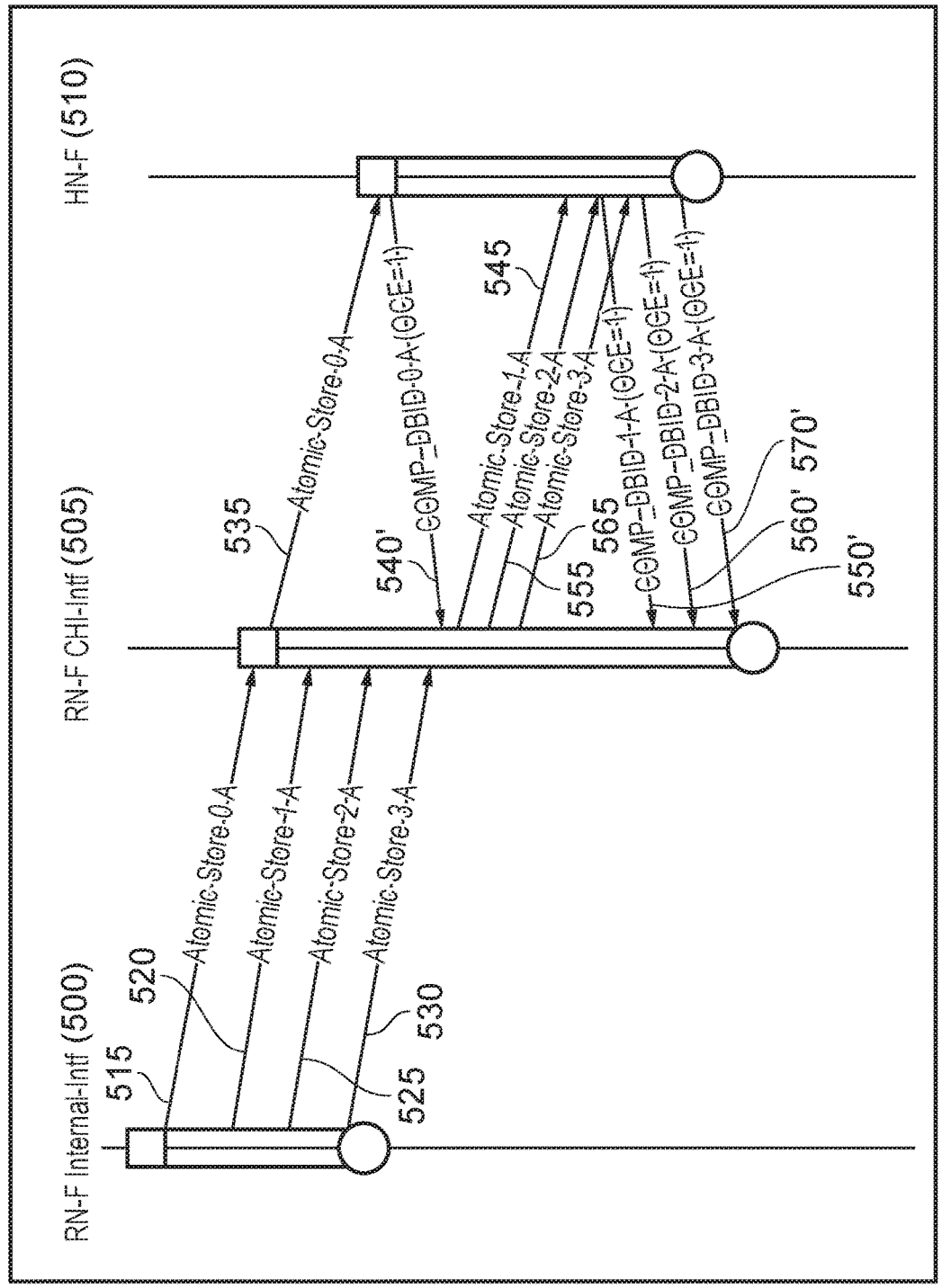
FIG. 9 is an equivalent timing diagram illustrating the performance improvements that can be realised when handling multiple transactions to the same address, by employing the techniques described herein.

As seen in FIG. 8, each subsequent atomic store transaction has to await the data pull signal for the preceding atomic store transaction before it can be issued, as indicated by the sequence of signal lines 550, 555, 560, 565 and 570. Hence, this can significantly impact the performance of the handling of the atomic store operations. However, through use of the technique described herein, the performance can be significantly improved if the transactions target an ordered-channel based completer. As shown in FIG. 9, four atomic store operations are routed from the internal interface 500 to the interconnect interface 505 in the same way as in FIG. 8, and indeed the first atomic store request is issued exactly as before in FIG. 8, as indicated by the signal line 535. However, in this instance the combined data pull and completion signal also provides the ordered channel indication and in this instance it is identified that an ordered channel exists (the OCE flag is set to 1), as indicated by the signal path 540'.

At this point, since the requester element knows that all of the transactions are targeting the same address, and hence will be processed by the same completer element, and it knows that an ordered channel exists with that completer element, all of the subsequent atomic store requests can be issued straightaway without awaiting any further acknowledgement signals from the completer element, as indicated by the series of transfers 545, 555, 565 in FIG. 9. In due course, a combined completion and data pull signal will be provided for each of those transactions, as indicated by the signal lines 550', 560' and 570'.

Whilst in FIG. 9 the requester element is considered to be a fully coherent master (RN-F), the same technique can also be used for an I/O coherent master (RN-I). Similarly, the completer element can be a non-coherent home node (HN-I) instead of a fully coherent home node (HN-F).

Figure 10:
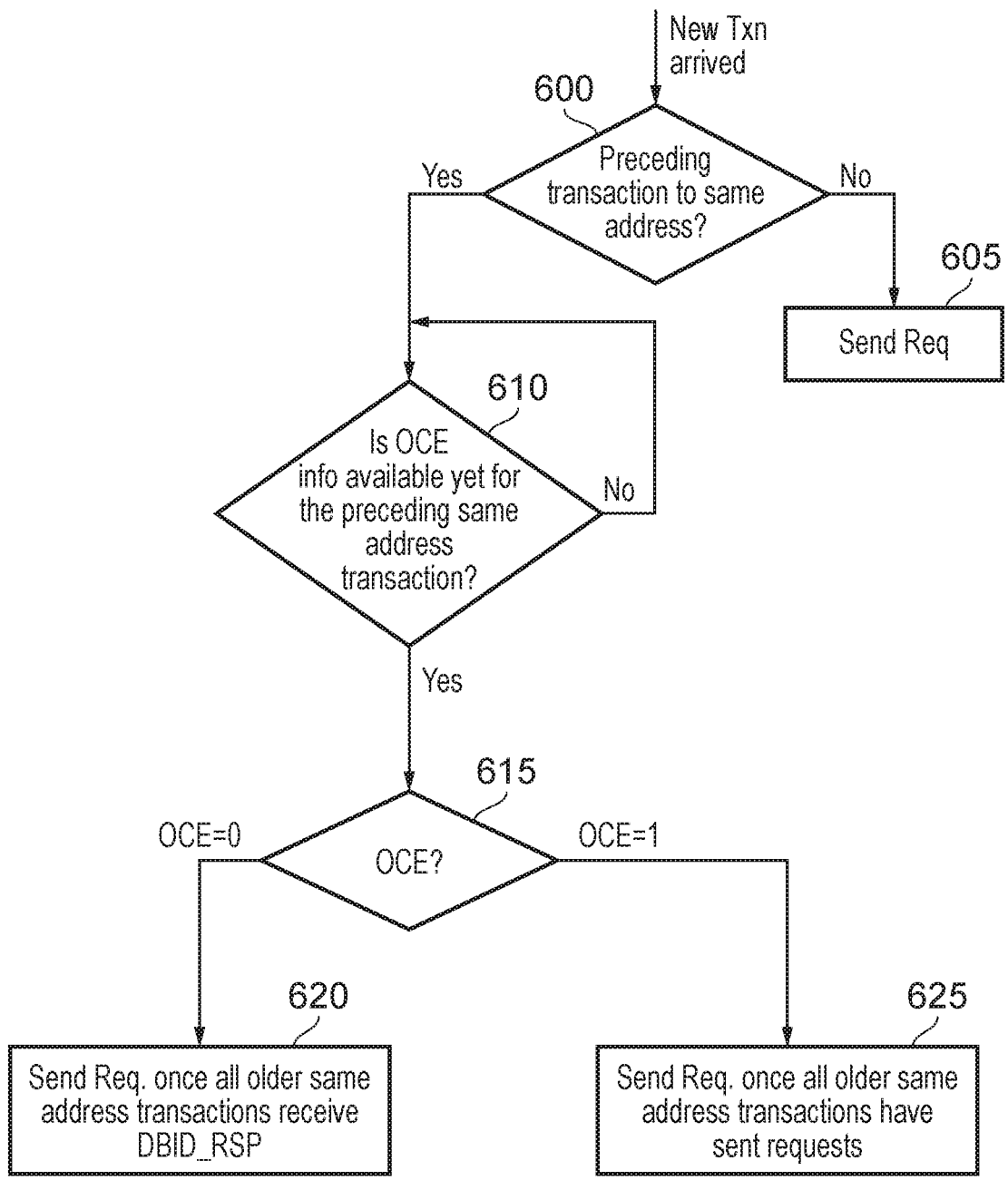
FIG. 10 is a flow diagram illustrating the operation of the requester element in order to facilitate use of the technique as illustrated in FIG. 9, in accordance with one example implementation.

FIG. 10 is a flow diagram illustrating steps performed by the interconnect interface of the requester element in accordance with one example implementation. At step 600, when considering a new transaction, it is determined whether the preceding transaction is to the same address. This could be the immediately preceding transaction or any one of the earlier transactions in the sequence. If the new transaction does not relate to the same address as a preceding transaction, then the process proceeds to step 605 where the request is sent. In particular, it is determined at this stage that there is no address hazarding issue. However, if there is a preceding transaction to the same address then the process proceeds to step 610 where it is determined whether the OCE information is yet available for the preceding same address transaction. As will be apparent from the earlier discussed FIG. 9, this can be provided as part of the response signal issued by the completer element processing a transaction for that address. Whilst at step 610 the requester may be awaiting receipt of that signal before determining the OCE information, in an alternative implementation the requester element could maintain a storage in which it could capture addresses and associated OCE values provided for previous transactions to those addresses, and hence can reference the storage in order to determine whether the OCE information is available.

Thereafter, once the OCE information is available for the address, it is determined at step 615 whether the OCE indication was set to 1 to indicate an ordered channel or not. If not, then the process proceeds to step 620 where the request for the new transaction is only sent once the requester element has received the data pull response for all older same address transactions, thus adopting the signal timing scheme of FIG. 8.

However, if the OCE flag is set to 1, then the process proceeds to step 625 where the request can be sent once the requester element has sent the requests for all older same address transactions, thus adopting the signal timing scheme of FIG. 9, and yielding a significant performance improvement.

It will be appreciated that the techniques described herein enable a significant performance improvement to be realised when handling a sequence of ordered transactions, enabling interconnect-agnostic requester element designs to be used whilst optimising ordering flows. The techniques enable, for example, a CHI-based interconnect to use PCIe root port designs, with the technique being fully optimised for write ordering independent of whether the completer element is a point of serialisation (like an HN-F), or not a point of serialisation (like an HN-I or CXRA component) but having an ordered channel. It further enables CPU designs which are more efficient for address ordered transactions if the transactions target completers having an ordered channel.

Whilst the technique can be used in a variety of different applications, some non-limiting examples of applications where this technique can assist in achieving high throughput include atomics processing to local fully coherent home nodes, atomic processing to remote fully coherent home nodes (in a CCIX based system), ordered write processing to a non-coherent home node in order to support peer to peer PCIe writes, or ordered write processing to remote fully coherent home nodes and remote non-coherent home nodes (in a CCIX based system).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a plurality of completer processing elements each of which configured to process transactions;
a requester processing element configured to issue a sequence of ordered transactions; and
an interconnect providing, for each completer processing element, a communication channel between that completer processing element and the requester processing element for transfer of signals between that completer processing element and the requester processing element;
wherein:
a given completer processing element that is processing a given transaction in the sequence is arranged to issue a response signal to the requester processing element over its associated communication channel that comprises an ordered channel indication to identify whether the associated communication channel has an ordered channel property, where the ordered channel property guarantees that processing of transactions issued by the requester processing element over that associated communication channel in a given order will be completed by the given completer processing element in the same given order; and
the requester processing element is responsive to the ordered channel indication to control timing of issuance from the requester processing element of at least one signal relating to one or more transactions after the given transaction in the sequence.

2. The apparatus as claimed in claim 1, wherein the requester processing element is arranged to choose a signal timing scheme from a plurality of signal timing schemes to use for the one or more transactions after the given transaction in the sequence, in dependence on the ordered channel indication.

3. The apparatus as claimed in claim 2, wherein the requester processing element is arranged to further take into account, when choosing the signal timing scheme, whether the given transaction and the one or more transactions after the given transaction are to be processed by the same completer processing element.

4. The apparatus as claimed in claim 2, wherein: during processing of a transaction in the sequence, the requester processing element is arranged to issue a release indication signal to the completer processing element processing that transaction when the requester processing element determines that the data processed by all previous transactions in the sequence is observable, the release indication signal authorizing the completer processing element to make the data that is being processing by the transaction available to other requester processing elements; and the plurality of signal timing schemes employ different criteria to determine when the release indication signal is to be issued.

5. The apparatus as claimed in claim 4, wherein: each completer processing element is arranged to issue a completion signal to the requester processing element when processing a transaction specifying a memory address, to indicate that sufficient steps have been taken by the completer processing element to ensure that an outcome of an operation required by that transaction will be observed by a further requester processing element that issues a further transaction specifying that memory address to the completer processing element; and in accordance with a first signal timing scheme in the plurality, the requester processing element is arranged to issue the release indication signal to the completer processing element processing a current transaction when a completion signal has been received by the requester processing element for all preceding transactions in the sequence prior to the current transaction.

6. The apparatus as claimed in claim 4, wherein: each completer processing element is arranged to issue a data pull signal to the requester processing element when processing a transaction, to trigger the requester processing element to transmit to the completer processing element an item of data to be processed by the transaction; and in accordance with a second signal timing scheme in the plurality, the requester processing element is arranged to issue the release indication signal to the completer processing element processing a current transaction when a data pull signal has been received by the requester processing element for all preceding transactions in the sequence prior to the current transaction.

7. The apparatus as claimed in claim 6, wherein: the requester processing element is arranged when considering which signal timing scheme to use for the current transaction, to: detect when the response signal providing the ordered channel indication has been provided for both the current transaction and a preceding transaction; determine from a source indication field provided in both response signals whether those response signals have been issued by a same completer processing element; and when the response signals have been issued by the same completer processing element and the ordered channel indication indicates that the ordered channel property exists in the associated communication channel between the requester processing element and the same completer processing element, to employ the second signal timing scheme; and otherwise to employ the first signal timing scheme.

8. The apparatus as claimed in claim 7, wherein:
the data pull signal is used as the response signal providing the ordered channel indication.

9. The apparatus as claimed in claim 4, wherein the sequence of ordered transactions comprises a sequence of ordered write transactions.

10. The apparatus as claimed in claim 2, wherein: the requester processing element has knowledge that the sequence of ordered transactions will be processed by the same completer processing element; and the requester processing element is arranged when considering which signal timing scheme to use for each subsequent transaction in the sequence after a current transaction, to: detect when the response signal providing the ordered channel indication has been provided for the current transaction; when the ordered channel indication indicates that the ordered channel property exists in the associated communication channel between the requester processing element and the completer processing element, to issue a request transfer signal for each subsequent transaction once the request transfer signals have been issued for all transactions in the sequence prior to that subsequent transaction; and otherwise to constrain timing of issuance of the request transfer signal for each subsequent transaction until a predetermined signal has been received from the completer processing element for all transactions in the sequence prior to the subsequent transaction.

11. The apparatus as claimed in claim 10, wherein: the sequence of ordered transactions comprises a sequence of ordered write transactions, and the predetermined signal is a data pull signal issued by the completer processing element to the requester processing element when processing a transaction, to trigger the requester processing element to transmit to the completer processing element an item of data to be processed by the transaction.

12. The apparatus as claimed in claim 11, wherein:
the data pull signal for the current transaction is used as the response signal providing the ordered channel indication.

13. The apparatus as claimed in claim 10, wherein: the sequence of ordered transactions comprises a sequence of ordered read transactions, and the predetermined signal is a read receipt signal issued by the completer processing element to the requester processing element when processing a transaction.

14. The apparatus as claimed in claim 13, wherein:
the read receipt signal for the current transaction is used as the response signal providing the ordered channel indication.

15. The apparatus as claimed in claim 10, wherein the requester processing element has knowledge that the sequence of ordered transactions will be processed by the same completer processing element by virtue of each of the transactions specifying the same address.

16. The apparatus as claimed in claim 1, wherein the ordered channel indication is arranged to indicate the ordered channel property when both a transport layer and a protocol layer of the communication channel are constrained to handle transactions in order.

17. A method of handling ordered transactions, comprising:
employing a plurality of completer processing elements each of which configured to process transactions;
employing a requester processing element configured to issue a sequence of ordered transactions; and
providing, for each completer processing element, a communication channel between that completer processing element and the requester processing element for transfer of signals between that completer processing element and the requester processing element;
causing a given completer processing element that is processing a given transaction in the sequence to issue a response signal to the requester processing element over its associated communication channel that comprises an ordered channel indication to identify whether the associated communication channel has an ordered channel property, where the ordered channel property guarantees that processing of transactions issued by the requester processing element over that associated communication channel in a given order will be completed by the given completer processing element in the same given order; and
arranging the requester processing element to be responsive to the ordered channel indication to control timing of issuance from the requester processing element of at least one signal relating to one or more transactions after the given transaction in the sequence.

18. An apparatus comprising:
a plurality of completer processing element means each of which configured to process transactions;
a requester processing element means configured to for issue a sequence of ordered transactions; and
an interconnect means for providing, for each completer processing element means, a communication channel between that completer processing element means and the requester processing element means for transfer of signals between that completer processing element means and the requester processing element means;
wherein:
a given completer processing element means that is processing a given transaction in the sequence is arranged to issue a response signal to the requester processing element means over its associated communication channel that comprises an ordered channel indication to identify whether the associated communication channel has an ordered channel property, where the ordered channel property guarantees that processing of transactions issued by the requester processing element means over that associated communication channel in a given order will be completed by the given completer processing element means in the same given order; and
the requester processing element means for controlling, in response to the ordered channel indication, timing of issuance from the requester processing element means of at least one signal relating to one or more transactions after the given transaction in the sequence.

* * * * *